US012808231B2

(12) United States Patent
Hamsagar et al.

(10) Patent No.: US 12,808,231 B2
(45) Date of Patent: Nov. 24, 2026

(54) ELECTRIFIED LATCH RETRACTION ASSEMBLY

(71) Applicant: Schlage Lock Company LLC, Carmel, IN (US)

(72) Inventors: Akhil Ramesh Hamsagar, Bangalore (IN); Niveditha Shet, Mangalore (IN); Chandru Hoti, Bangalore (IN); Aditya Kedilaya, Bengaluru (IN); Shivangi Agrawal, Bangalore (IN); Jesse Cronin, Colorado Springs, CO (US); Jeff Seabaugh, Colorado Springs, CO (US); James Bembenek, Westfield, IN (US); Eric Drummond, Divide, CO (US)

(73) Assignee: Schlage Lock Company LLC, Carmel, IN (US)

( * ) Notice: Subject to any disclaimer, the term of this patent is extended or adjusted under 35 U.S.C. 154(b) by 127 days.

(21) Appl. No.: 18/618,073

(22) Filed: Mar. 27, 2024

(65) Prior Publication Data

US 2025/0305322 A1 Oct. 2, 2025

(51) Int. Cl.
*E05B 47/00* (2006.01)
*E05B 63/08* (2006.01)

(52) U.S. Cl.
CPC .......... *E05B 47/0012* (2013.01); *E05B 63/08* (2013.01); *E05B 2047/0017* (2013.01);
(Continued)

(58) Field of Classification Search
CPC ............... E05B 47/0012; E05B 47/026; E05B 2047/0023; E05B 2047/0017;
(Continued)

(56) References Cited

U.S. PATENT DOCUMENTS 3,890,608 A * 6/1975 Peterson ................. E05B 45/06 340/545.7
4,364,249 A * 12/1982 Kleefeldt ................ E05B 81/16 292/201
(Continued)

FOREIGN PATENT DOCUMENTS

GB 2516950 A 2/2015

OTHER PUBLICATIONS

International Search Report; ISA/US; International Application No. PCT/US2025/021805; Aug. 27, 2025; 6 pages.
(Continued)

*Primary Examiner* — Christine M Mills
*Assistant Examiner* — Faria F Ahmad
(74) *Attorney, Agent, or Firm* — Taft Stettinius & Hollister LLP

(57) ABSTRACT

An exemplary access control device has a locked/unlocked state and a latched/unlatched state, and generally includes a housing, a latchbolt, a handle, a drive assembly, and a latch retraction assembly. The latchbolt is mounted in the housing for movement between an extended position, in which the latched/unlatched state is a latched state, and a retracted position, in which the latched/unlatched state is an unlatched state. The handle is operable to retract the latchbolt when the locked/unlocked state is an unlocked state, and the handle is inoperable to retract the latchbolt when the locked/unlocked state is a locked state. The drive assembly includes a first motor configured to operate in response to a lock/unlock signal to thereby adjust the locked/unlocked state. The latch retraction assembly includes a second motor configured to operate in response to a latch/unlatch signal to thereby adjust the latched/unlatched state.

24 Claims, 16 Drawing Sheets

(52) U.S. Cl.
CPC . *E05B 2047/002* (2013.01); *E05B 2047/0036* (2013.01); *E05B 2047/0094* (2013.01)

(58) Field of Classification Search
CPC ....... E05B 2047/002; E05B 2047/0036; E05B 2047/0094; E05B 63/08
See application file for complete search history.

(56) References Cited

U.S. PATENT DOCUMENTS 4,429,556 A * 2/1984 Kambic .................. E05B 57/00 70/472
4,509,347 A * 4/1985 Young ................. E05B 47/0002 70/279.1
4,633,688 A * 1/1987 Beudat ................ E05B 63/0017 70/279.1
4,677,834 A * 7/1987 Hicks .................. E05B 47/0002 70/279.1
4,685,709 A * 8/1987 Kambic .............. E05B 47/0012 292/201
5,078,436 A * 1/1992 Kleefeldt ................ E05B 77/28 292/216
5,123,691 A * 6/1992 Ginn ................... E05B 47/0012 292/201
5,473,922 A 12/1995 Bair et al.
5,474,348 A * 12/1995 Palmer ................ E05B 47/0669 292/144
5,480,198 A * 1/1996 Wydler ................... F16H 19/06 292/144
5,531,086 A * 7/1996 Bryant ................ E05B 63/0004 70/279.1
5,896,765 A * 4/1999 Peyre .................. E05B 47/0012 292/144
6,016,677 A 1/2000 Clark
6,318,138 B1 * 11/2001 Mathews ............ E05B 47/0012 70/279.1
2003/0024288 A1 * 2/2003 Gokcebay ............... E05B 63/06 70/432
2011/0203331 A1 * 8/2011 Picard ................. E05B 47/0046 29/829
2015/0184425 A1 * 7/2015 Ellis .......................... E05C 1/08 292/144
2016/0017638 A1 * 1/2016 Dore Vasudevan .... E05B 55/12 292/137
2016/0060904 A1 * 3/2016 Dore Vasudevan ......................... E05B 47/0673 292/144
2017/0247912 A1 * 8/2017 Ando .................... E05B 47/026
2017/0268256 A1 9/2017 Geringer et al.
2018/0340352 A1 * 11/2018 Compton ............ E05B 47/0046
2019/0063113 A1 2/2019 Milligan et al.
2019/0100940 A1 4/2019 Imanuel et al.
2022/0381063 A1 * 12/2022 Liao .................... E05B 47/0012
2022/0403680 A1 12/2022 King et al.
2023/0349196 A1 11/2023 Lunday
2024/0068274 A1 2/2024 Riley et al.
2024/0093534 A1 * 3/2024 Chirumbolo ............ D06F 39/14
2025/0223840 A1 * 7/2025 Lim ...................... E05C 19/024

OTHER PUBLICATIONS

Written Opinion of the International Searching Authority; ISA/US; International Application No. PCT/US2025/021805; Aug. 27, 2025; 14 pages.

* cited by examiner

ELECTRIFIED LATCH RETRACTION ASSEMBLY

TECHNICAL FIELD

The present disclosure generally relates to electrified lockset assemblies, and more particularly but not exclusively relates to electrified latch retraction assemblies for mortise locksets.

BACKGROUND

Latch retraction assemblies are occasionally installed to access control devices in order to provide for electrified retraction of a latchbolt. For example, certain existing mortise locksets are provided with motorized electric latch retraction assemblies in which a motor is utilized to selectively retract the latchbolt against the internal biasing forces of the mortise lockset. However, existing approaches typically require relatively large motors that project from the mortise housing, and accordingly cannot be used in standard existing mortise pockets. Instead, the door must be further modified in order to accept the mortise lockset. For these reasons among others, there remains a need for further improvements in this technological field.

SUMMARY

An exemplary access control device has a locked/unlocked state and a latched/unlatched state, and generally includes a housing, a latchbolt, a handle, a drive assembly, and a latch retraction assembly. The latchbolt is mounted in the housing for movement between an extended position, in which the latched/unlatched state is a latched, and a retracted position, in which the latched/unlatched state is an unlatched state. The handle is operable to retract the latchbolt when the locked/unlocked state is an unlocked state, and the handle is inoperable to retract the latchbolt when the locked/unlocked state is a locked state. The drive assembly includes a first motor configured to operate in response to a lock/unlock signal to thereby adjust the locked/unlocked state. The latch retraction assembly includes a second motor configured to operate in response to a latch/unlatch signal to thereby adjust the latched/unlatched state. Further embodiments, forms, features, and aspects of the present application shall become apparent from the description and figures provided herewith.

DETAILED DESCRIPTION OF ILLUSTRATIVE EMBODIMENTS

Figure 1:
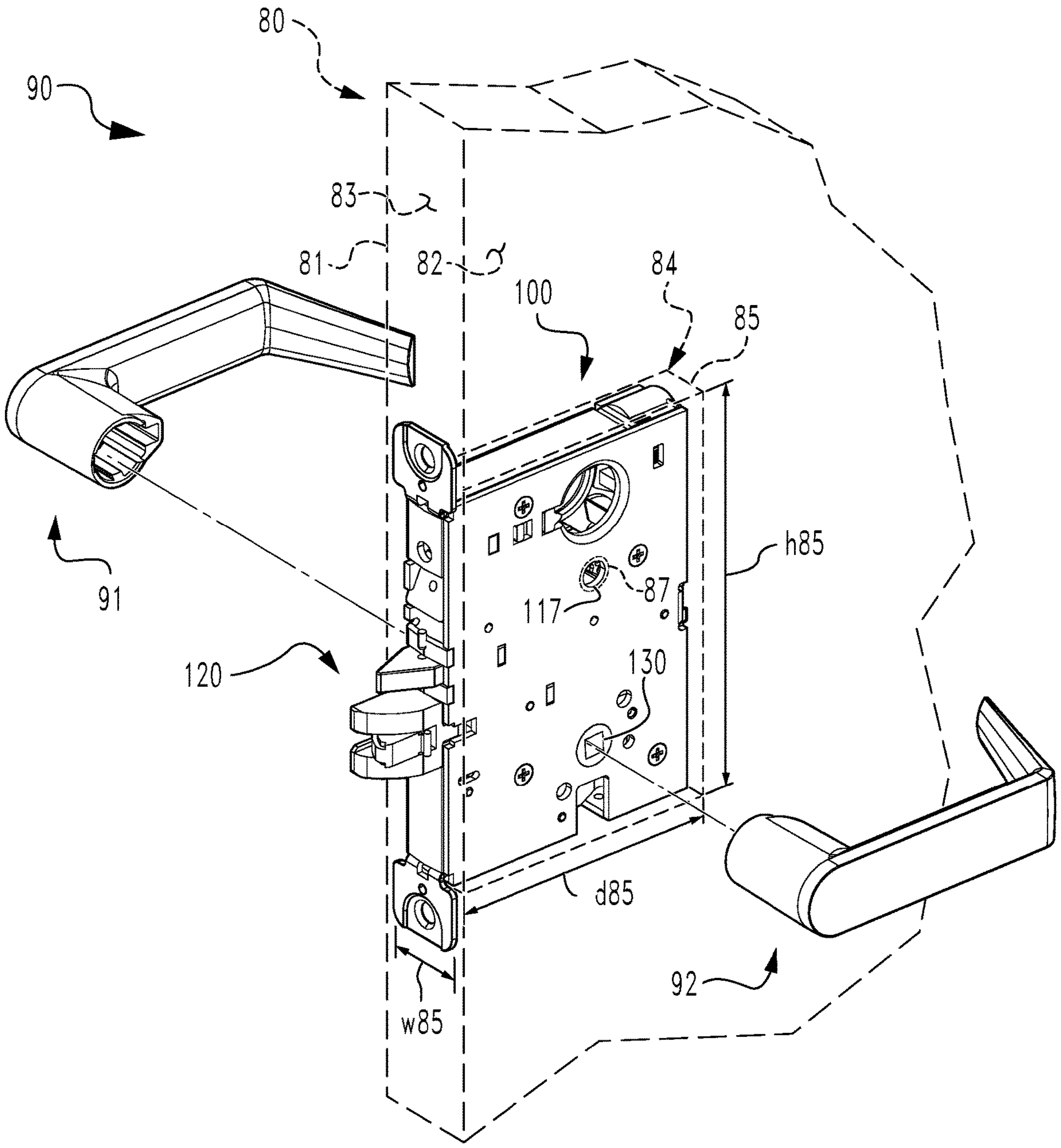
FIG. 1 is a partially-exploded view of an access control system according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a door 80 having installed thereto an access control device in the form of a mortise lockset 90 according to certain embodiments. The door 80 has an egress side 81, a non-egress side 82 opposite the egress side 81, and a latch edge 83, and includes a standard mortise door preparation 84. The door preparation 84 comprises a mortise pocket 85 having standard mortise pocket dimensions. For example, the pocket 85 may have a depth d85 of about 4 inches and a height h85 of about 6⅜ inches. The width w85 of the pocket 85 may vary with door thickness, but is typically provided as either 1 inch or 1¼ inches. The lockset 90 generally includes a mortise chassis 100 mounted within the mortise pocket 85, an inside handle 91 coupled with the mortise chassis 100 on the egress side 81, and an outside handle 92 coupled with the mortise chassis 100 on the non-egress side 82.

The illustrated lockset 90 has a plurality of adjustable states, including a latched/unlatched state and a locked/unlocked state. The latched/unlatched state is adjustable between a latched state, in which a latchbolt 120 of the mortise chassis 100 is extended and the lockset 90 is operable to retain the door 80 in a closed position, and an unlatched state, in which the latchbolt 120 is retracted and is inoperable to retain the door 80 in its closed position. Similarly, the locked/unlocked state is adjustable between a locked state, in which the outside handle 92 is inoperable to retract the latchbolt 120, and an unlocked state, in which the outside handle 92 is operable to retract the latchbolt 120. As described herein, the lockset 90 includes an electrified latch retraction assembly 190 operable to electronically adjust the latched/unlatched state between the latched state and the unlatched state. In certain embodiments, the lockset 90 includes a drive assembly 150 operable to electronically adjust the locked/unlocked state between the locked state and the unlocked state.

Figure 2:
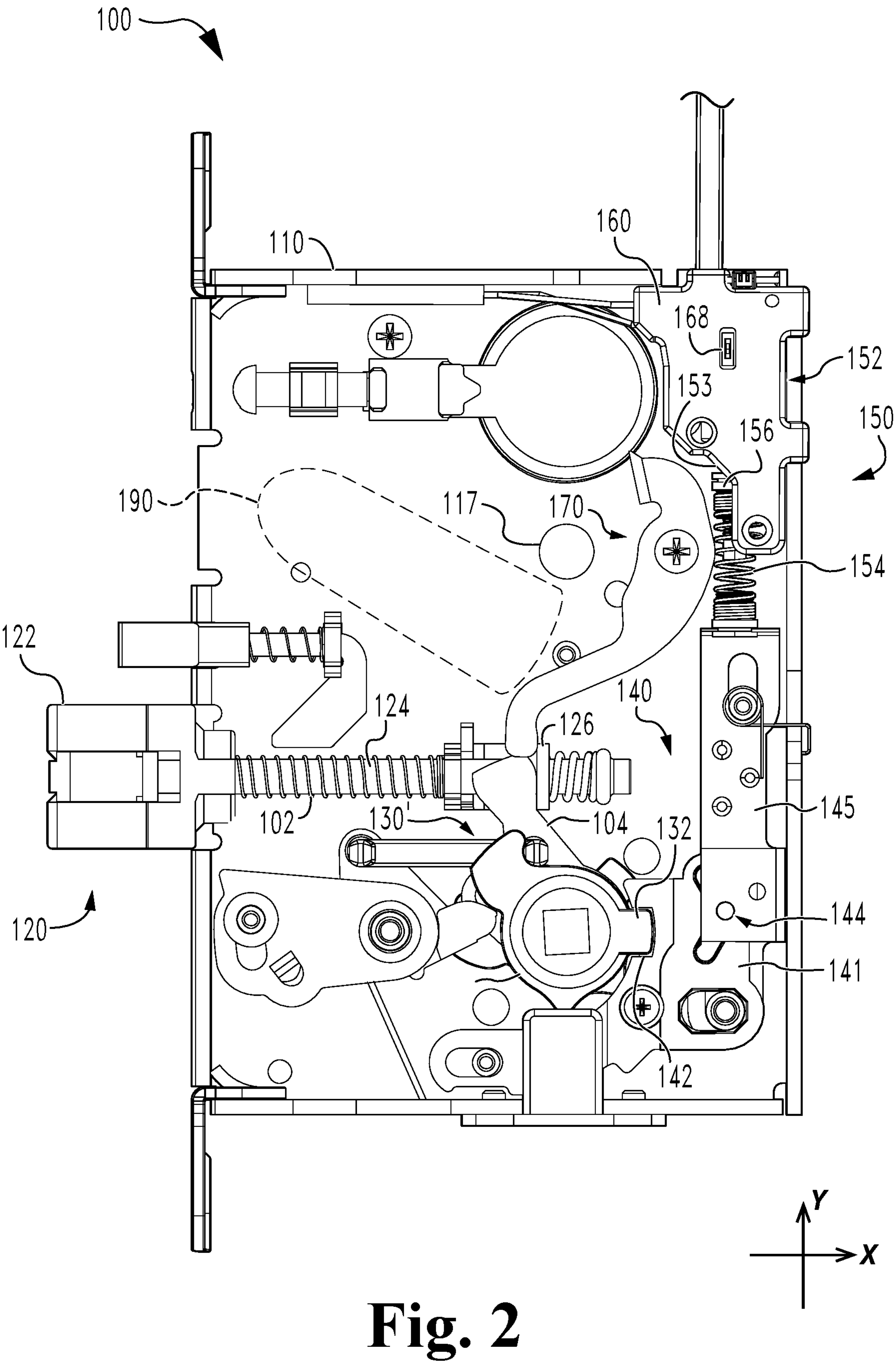
FIG. 2 is a plan view of a mortise chassis according to certain embodiments in a locked state.

With additional reference to FIG. 2, the mortise chassis 100 generally includes a housing 110, a latchbolt 120 slidably mounted in the housing 110, a hub 130 operable to retract the latchbolt 120, a catch assembly 140 operable to selectively prevent rotation of the hub 130, a drive assembly 150 operable to move the catch assembly 140 between a blocking state and a non-blocking state to thereby lock and unlock the lockset 100, and a control assembly 160 operable to control the drive assembly 150 for selection of the locked/unlocked state. In certain embodiments, the mortise chassis 100 may further include a retraction lever 170 operable to retract the latchbolt 120, for example in response to actuation of a latch retraction assembly 190. As described herein, the illustrated mortise chassis 100 further includes such an electrified latch retraction assembly 190, which is operable to move the latchbolt 120 electronically for selection of the latched/unlatched state.

The housing 110 is configured for mounting within the mortise pocket 85, and may have standard dimensions corresponding to those of the standard mortise pocket 85 to ensure that the chassis 100 is operable to be mounted in the standard mortise pocket 85. For example, the housing 110 may be provided with a generally parallelepiped geometry with a housing height corresponding to the pocket height h85, a housing depth corresponding to the pocket depth d85, and a housing width corresponding to the pocket width w85. The housing 110 includes an aperture 117, and the door 80 may include a corresponding aperture 87. The apertures 87, 117 may, for example, be configured to facilitate the use of a thumbturn in certain embodiments of the chassis 100.

The latchbolt 120 is slidably mounted in the housing 110 for movement between an extended position and a retracted position, and generally includes a head 122, a stem 124 extending rearward from the head 122, and a bracket 126 mounted to the stem 124. A spring 102 is mounted to the stem 124 and engages a flange of the housing 110 to thereby bias the latchbolt 120 toward its extended position.

The hub 130 is rotatably mounted in the housing 110, and is operable to engage the latchbolt 120 via a retractor 104. Rotation of the hub 130 from a home position to a rotated position causes the retractor 104 to engage the bracket 126 and retract the latchbolt 120 against the biasing force of the spring 102. The hub 130 is configured for coupling with the outside handle 92 such that the outside handle 92 is selectively operable to retract the latchbolt 120. As described herein, the catch assembly 140 is operable to selectively prevent rotation of the hub 130 to thereby selectively prevent retraction of the latchbolt 120 by the outside handle 92.

In certain forms, the chassis 100 may further include a second hub 130' rotatably mounted on the opposite side of the retractor 104 such that each of the hubs 130, 130' is individually operable to retract the latchbolt 120. The second hub 130' may be coupled with the inside handle 91 to thereby facilitate retraction of the latchbolt 120 by the inside handle 91. In certain embodiments, the catch assembly 140 may be operable to selectively prevent rotation of the second hub 130' such that the inside handle 91 is inoperable to actuate the latchbolt 120 when the chassis 100 is in the locked state. In other embodiments, the catch assembly 140 may be inoperable to selectively prevent rotation of the second hub 130' such that the inside handle 91 is at all times operable to retract the latchbolt 120 to thereby provide for free egress.

Figure 3:
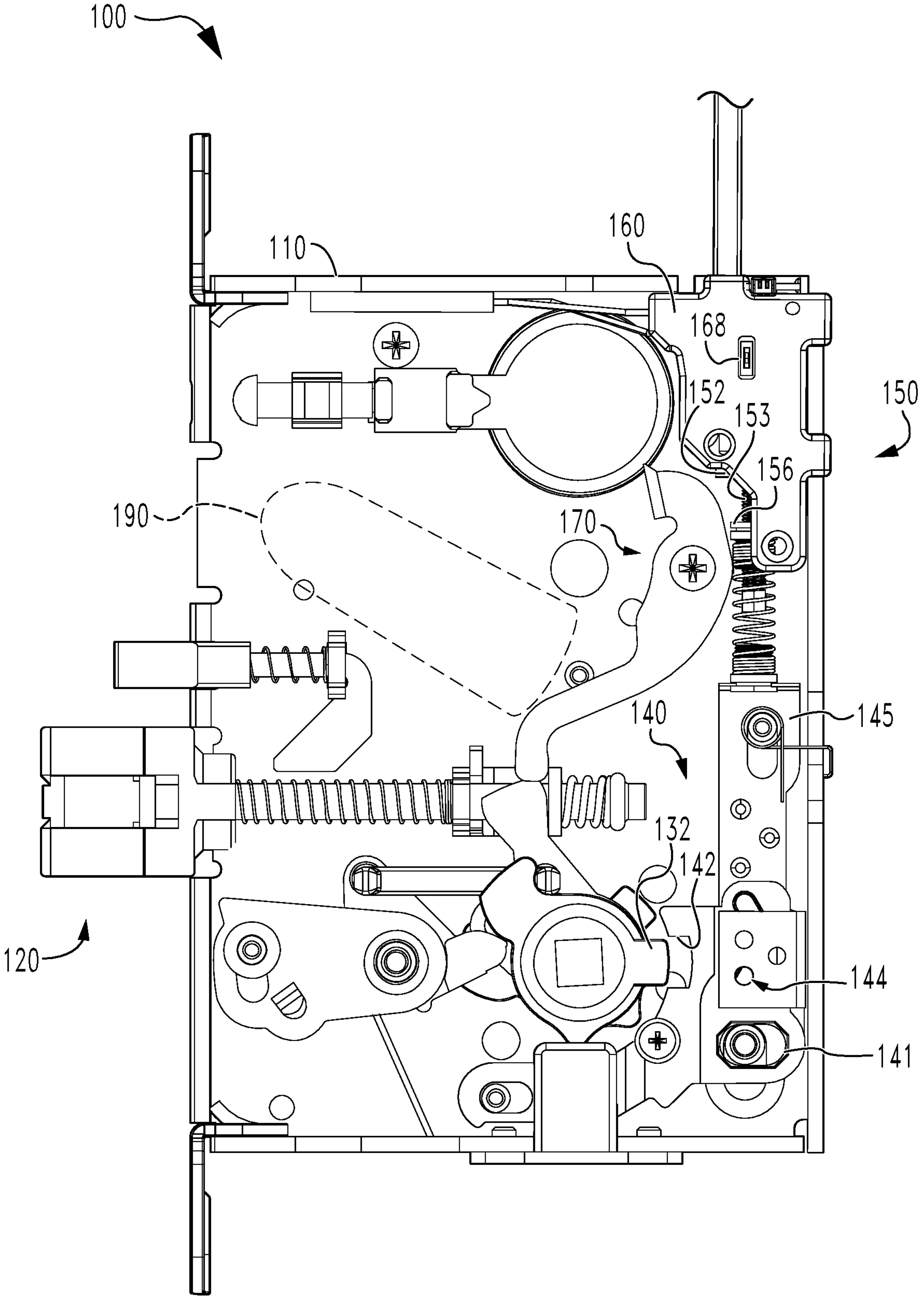
FIG. 3 is a plan view of the mortise chassis in an unlocked state.

With additional reference to FIG. 3, the catch assembly 140 generally includes a catch 141 mounted for sliding lateral movement within the housing 110, and a link 145 mounted for sliding longitudinal movement within the housing 110. The catch assembly 140 has a blocking state (FIG. 2), in which each of the catch 141 and the link 145 is in a corresponding and respective blocking position, and an unblocking state (FIG. 3), in which each of the catch 141 and the link 145 is in a corresponding and respective unblocking position. The catch 141 is engaged with the link 145 via a cam interface 149 that causes lateral movement of the catch 141 in response to longitudinal movement of the link 145. As such, longitudinal movement of the link 145 between its blocking position and its unblocking position causes a corresponding movement of the catch 141 between its blocking position and its unblocking position.

With the catch assembly 140 in the blocking state (FIG. 2), the catch 141 is in its blocking position, in which the catch 141 prevents rotation of the hub 130. In the illustrated form, this blocking is accomplished by interference between a protrusion 132 of the hub 130 and a recess 142 of the catch 141. It is also contemplated that the catch 141 may be operable to prevent rotation of the hub 130 in another manner. By way of example, the hub 130 may instead include a protrusion, and the catch 141 may include a recess operable to receive the protrusion. Regardless of the precise geometries utilized, the catch assembly 140 in the blocking state prevents rotation of the hub 130, thereby preventing the outside handle 92 from retracting the latchbolt 120. As such, the blocking state of the catch assembly 140 corresponds to the locked state of the chassis 100.

With the catch assembly 140 in the unblocking state (FIG. 3), the catch 141 is in its unblocking position, in which the catch 141 is disengaged from the hub 130. The catch assembly 140 in the unblocking state thus does not prevent rotation of the hub 130, thereby facilitating retraction of the latchbolt 120 by the outside handle 92. As such, the unblocking state of the catch assembly 140 corresponds to the unlocked state of the chassis 100.

The drive assembly 150 is configured to move the catch assembly 140 between the blocking state and the unblocking state, and generally includes a motor 152 including a motor shaft 153, and a spring 154 connected between the motor shaft 153 and the link 145. The motor 152 is configured to rotate the motor shaft 153 in a first direction in response to an unlock signal, and is configured to rotate the motor shaft 153 in an opposite second direction in response to a lock signal. Rotation of the motor shaft 153 in the first direction causes the spring 154 to urge the link 145 in a first longitudinal direction from its blocking position (FIG. 2) to its unblocking position (FIG. 3). Rotation of the motor shaft 153 in the second direction causes the spring 154 to urge the link 145 in a second longitudinal direction from its unblocking position (FIG. 3) to its blocking position (FIG. 2).

As noted above, the spring 154 is configured to urge the link 145 in opposite longitudinal directions in response to rotation of the motor shaft 153 in opposite rotational directions. In certain embodiments, the motor shaft 153 may be externally threaded, and may be engaged with the spring 154 via a threaded collar 156 that advances and retreats along the threaded motor shaft 153 during rotation of the motor shaft 153 in opposite rotational directions. It is also contemplated that the motor shaft 153 may comprise an auger that engages coils of the spring 154 to thereby cause the spring 154 to urge the link 154 in opposite longitudinal directions. Regardless of the precise manner in which the drive assembly 150 urges the link 145 longitudinally, such longitudinal movement of the link 145 causes the cam interface 149 to move the catch 141 laterally to thereby adjust the blocking/unblocking state of the catch assembly 140, and thus the locked/unlocked state of the chassis 100.

Figure 4:
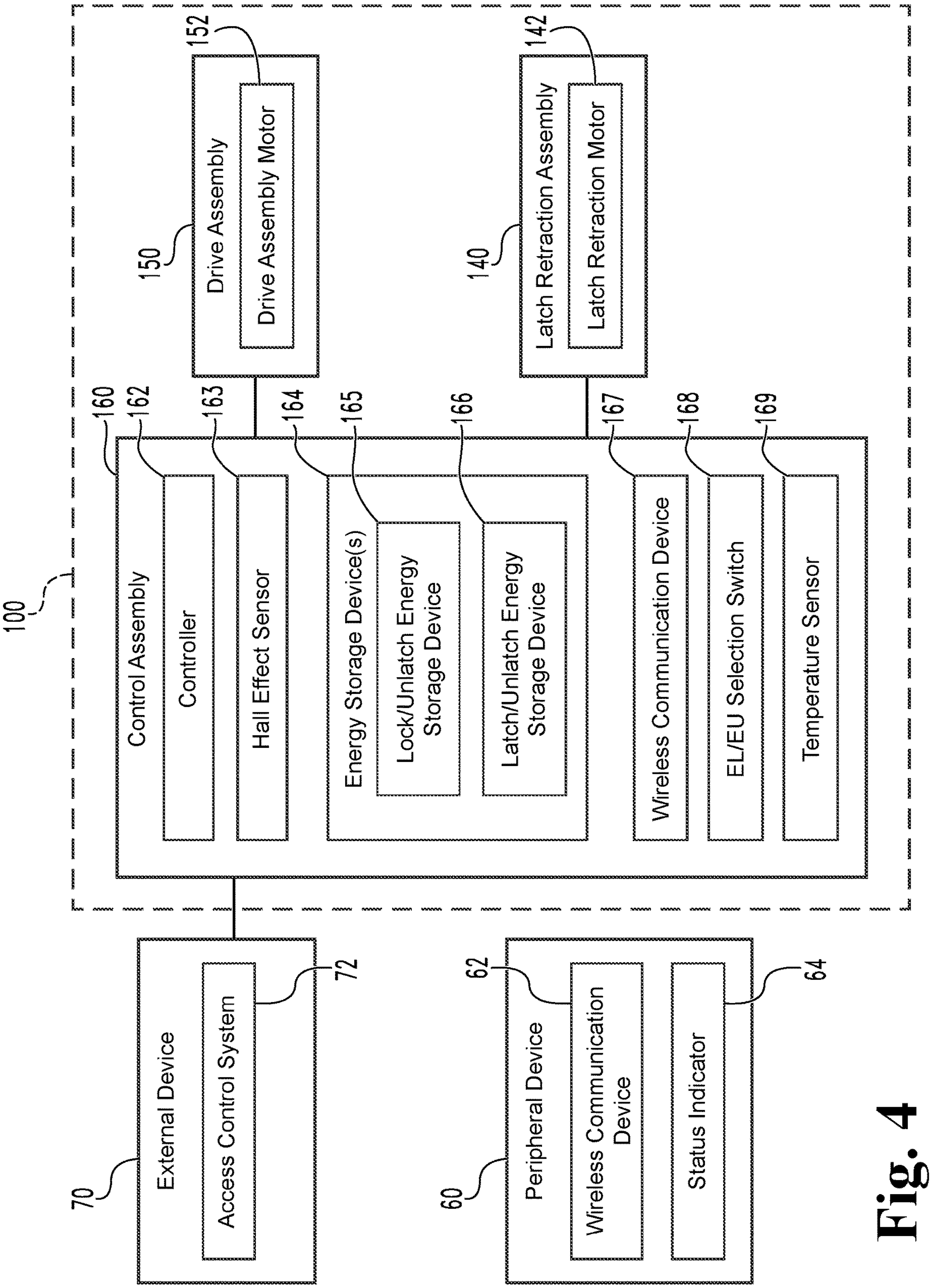
FIG. 4 is a schematic block diagram of the access control system illustrated in FIG. 1.
Figure 5:
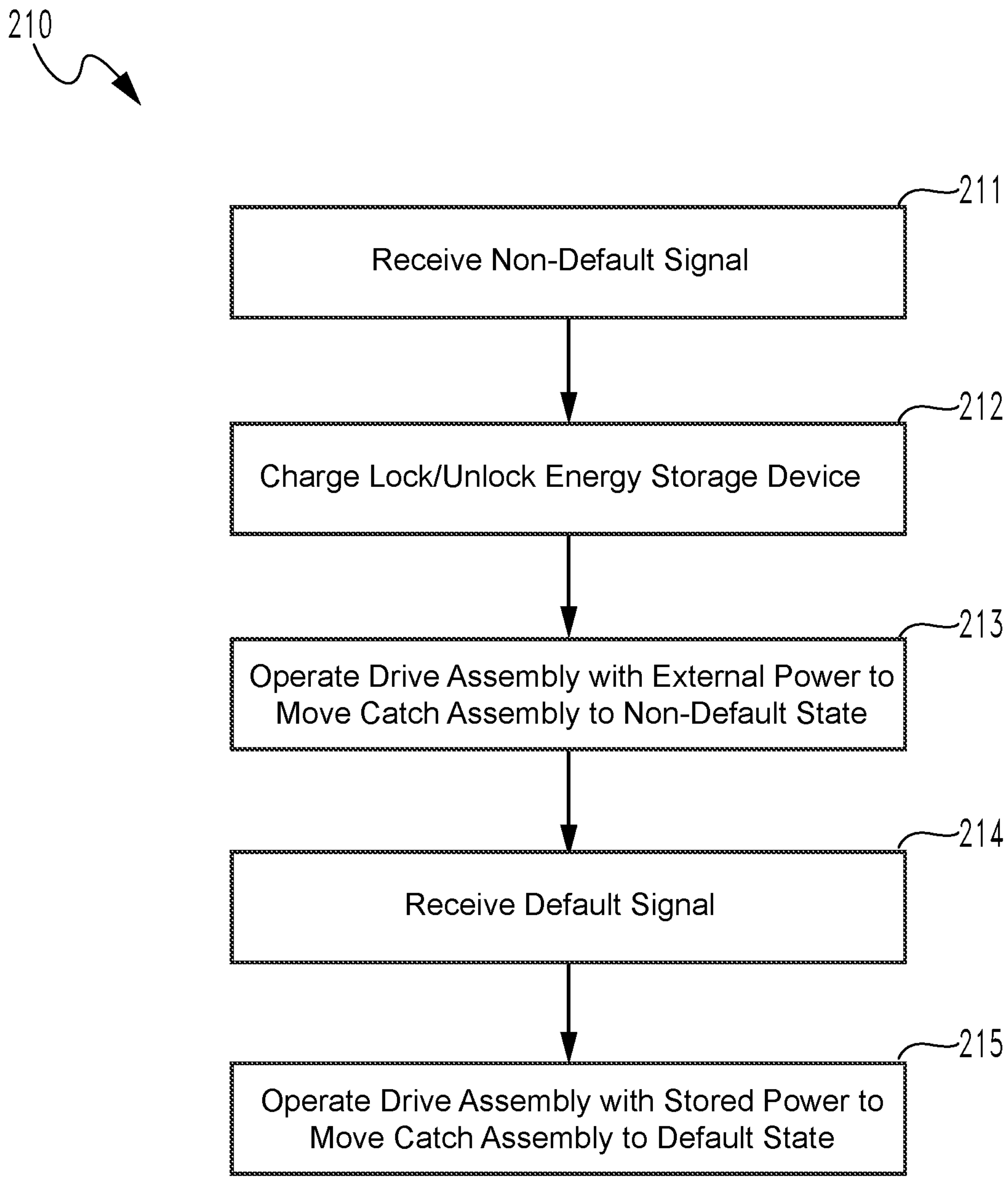
FIG. 5 is a schematic flow diagram of a process according to certain embodiments.

With additional reference to FIG. 4, the control assembly 160 generally includes a controller 162 and at least one energy storage device 164 operable to store electrical energy. In certain embodiments, one or more of the at least one energy storage device(s) 164 may comprise a super-capacitor, a battery, or another form of energy storage device. In the illustrated form, the control assembly 160 includes a lock/unlock energy storage device 165 operable to power the motor 152 of the drive assembly 150, and a latch/unlatch energy storage device 166 operable to power a motor 192 of the latch retraction assembly 190. In the illustrated form, the control assembly 160 is in communication with and receives power from an external device 70, such as an access control system 72. As described herein, the external device 70 is operable to transmit to the control assembly 160 a lock/unlock command that causes the control assembly 160 to initiate a lock/unlock procedure 210 (FIG. 5).

In certain embodiments, the control assembly 160 includes a wireless communication device 167 that facilitates communication with a peripheral device 60. The peripheral device 60 may, for example, be provided in the form of a trim that is mounted to the door 80. In certain forms, the wireless communication device 167 may be provided in the form of an infrared (IR) communication devices that communicates with the peripheral device 60 via the aligned openings 87, 117. While only one set of openings 87, 117 is illustrated in FIG. 1, it should be appreciated that another set of openings 87, 117 may be formed on the opposite side to facilitate communication between the chassis 100 and two peripheral devices (e.g., an inside trim and an outside trim).

The peripheral device 60 may be mounted to the door 80, and generally includes a wireless communication device 62 operable to facilitate communication with the wireless communication device 167. The peripheral device 60 may further include a status indicator 64 configured to display information relating to a status of the chassis 100.

Figure 10:
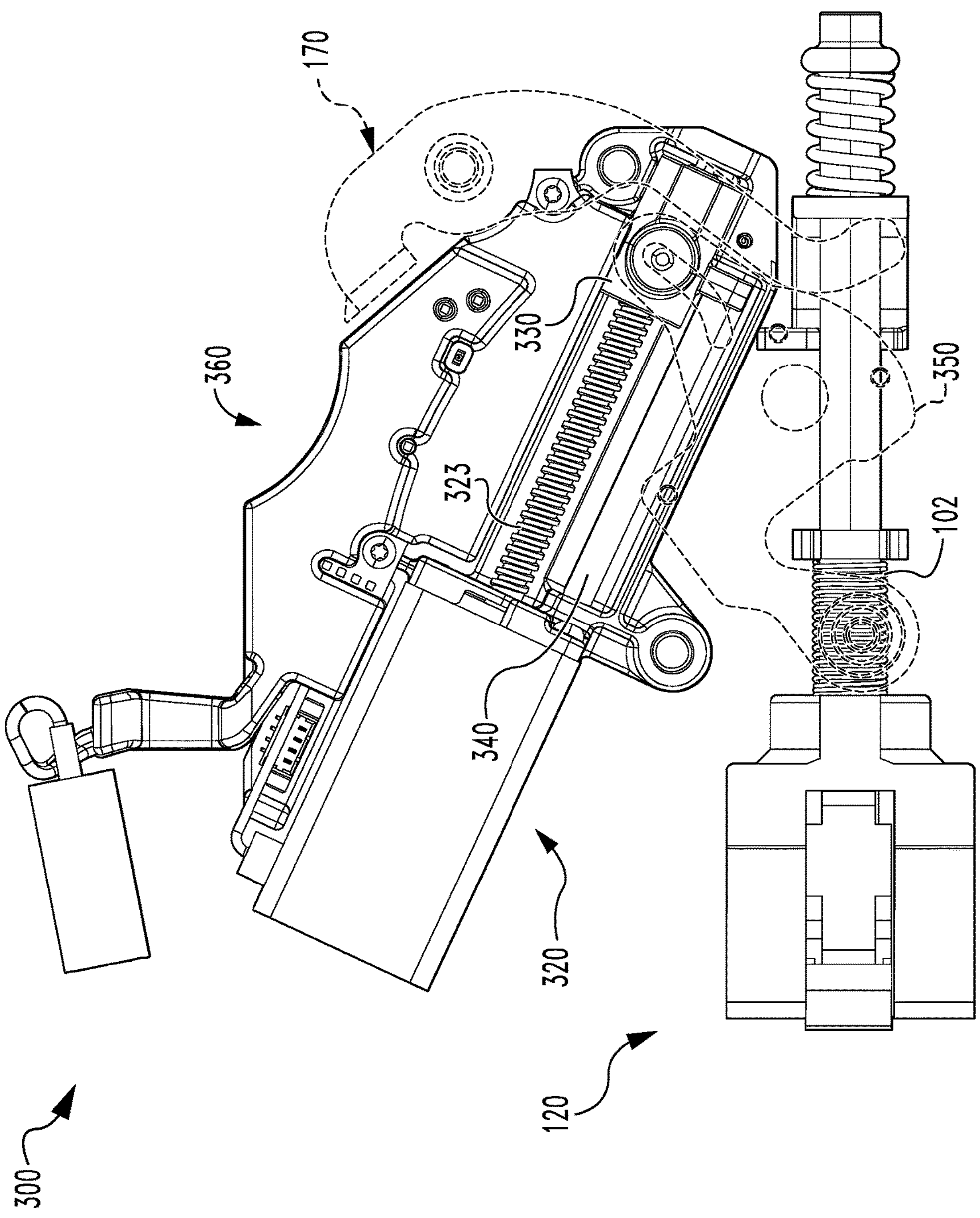
FIG. 10 is a plan view illustrating a portion of the mortise chassis with the latch retraction assembly in a second or retracting state.

The retraction lever 170 is pivotably mounted in the housing 110, and includes an arm 172 operable to engage the bracket 126 of the latchbolt 120. The retraction lever 170 is pivotable between a first retraction lever position (FIG. 2) and a second retraction lever position (FIG. 10). As described herein, movement of the retraction lever 170 from the first retraction lever position to the second retraction lever position causes the arm 172 to drive the bracket 126 rearward to thereby retract the latchbolt 120. As also described in further detail below, the retraction lever 170 may be moved between its first and second positions by the electrified latch retraction assembly 190.

The electrified latch retraction assembly 190 generally includes a motor 192, and is configured to extend and retract the latchbolt 120 in response to a latch/unlatch signal. As described herein, operating the motor 192 in a retract mode causes the retraction assembly 190 to drive the latchbolt 120 from the extended position to the retracted position, and operating the motor 192 in an extend mode causes the retraction assembly to drive the latchbolt 120 from the retracted position to the extended position. In certain embodiments, the latch retraction assembly 190 is self-dogging and operable to retain the latchbolt 120 in the retracted position against the biasing force of the spring 102 without the retraction assembly 190 consuming electrical power. Stated another way, the self-dogging nature of the latch retraction assembly 190 may obviate the need for the use of a holding current to maintain the latchbolt 120 in its retracted position. In certain embodiments, the latch retraction assembly 190 may cause the latchbolt 120 to extend and retract by pivoting the retraction lever 170 between its first and second positions.

With additional reference to FIG. 5, an exemplary lock/unlock procedure 210 that may be performed using the chassis 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the procedure 210 is described herein with specific reference to the mortise chassis 100 illustrated in FIGS. 2-4, it is to be appreciated that the procedure 210 may be performed with a lockset or chassis having additional or alternative features.

At the outset, it should be noted that an external device 70 (e.g., an access control system 72) may transmit to the control assembly 160 a lock/unlock command that is selectively and alternately provided as a non-default command and a default command. The non-default command may, for example, be provided in the form of electrical power in excess of a particular threshold, and the default command may be provided in the form of the absence of the non-default command. For example, the external device 70 may provide the control assembly 160 with power to indicate that the chassis 100 should adopt a non-default state (e.g., one of the locked state or the unlocked state), and may cut power to the control assembly 160 to indicate that the chassis 100 should adopt a default state (e.g., the other of the locked state or the unlocked state).

In certain embodiments, the control assembly 160 may include a selector switch 168 operable to transition the chassis 100 between an Electric Locking (EL) mode and an Electric Unlocking (EU) mode. When the EL mode is selected, the default state is the unlocked state, and the non-default state is the locked state. When the EU mode is selected, the default state is the locked state, and the non-default state is the unlocked state. The EL mode may alternatively be referred to as the fail safe mode, and the EU mode may alternatively be referred to as the fail secure mode.

The procedure 210 may begin with the chassis 100 in its default state. For example, the control assembly 160 may be receiving a default command (e.g., absence of the non-default command) such that the chassis 100 is in its default state.

The procedure 210 may include block 211, which includes receiving, by the control assembly 160, a non-default command (e.g., from the external device 70). For example, block 211 may include receiving power in excess of a predetermined threshold, which power is interpreted as the non-default command.

In response to receiving the non-default command in block 211, the procedure 210 may continue to block 212, which generally involves storing electrical energy in an energy storage device 164. For example, block 211 may involve storing energy in the lock/unlock energy storage device 165. As described herein, the energy to be stored in block 212 should be sufficient to cause the motor 152 to return the catch assembly 140 to its default state (e.g., one of the locking state or the unlocking state) following movement of the catch assembly 140 to its non-default state (e.g., the other of the locking state or the unlocking state).

Once a threshold amount of electrical energy has been stored in the lock/unlock energy storage device 165, the procedure 210 may continue to block 213, which generally involves operating the drive assembly 150 with external power to move the catch assembly 140 to its non-default state. For example, when the EL mode is selected, block 213 may involve operating the motor 150 to move the catch assembly 140 from the default unblocking state to the non-default blocking state. Conversely, when the EU mode is selected, block 213 may involve operating the motor 150 to move the catch assembly 140 from the default blocking state to the non-default unblocking state. Upon completion of block 213, the chassis 100 is in its non-default state.

After transitioning the chassis 100 to its non-default state in block 213, the control assembly 160 may receive a default command in block 214. For example, the external device 70 may cease transmitting the power that is interpreted as the non-default command. In response to receiving the default command (e.g., the lack of power) in block 214, the procedure 210 may continue to block 215, which generally involves returning the chassis 100 to its default state in response to the default command. More particularly, block 215 involves operating the drive assembly 150 with the energy stored in the lock/unlock energy storage device 165 to thereby move the catch assembly 140 to its default state.

As a result of block 215, the chassis 100 returns to its default state in response to the default command. For example, when the EL mode is selected, block 215 may involve returning the catch assembly 140 to its unblocking state to thereby adjust the chassis 100 to the unlocked state. Conversely, when the EU mode is selected, block 215 may involve returning the catch assembly 140 to its blocking state to thereby adjust the chassis 100 to the locked state. In addition or as an alternative to providing for electronic adjustment of the locked/unlocked state via the drive assembly 150 as set forth above, the chassis 100 may provide for electronic adjustment of the latched/unlatched state via the electrified latch retraction assembly 190, for example along the lines set forth with reference to FIG. 11.

Figure 6:
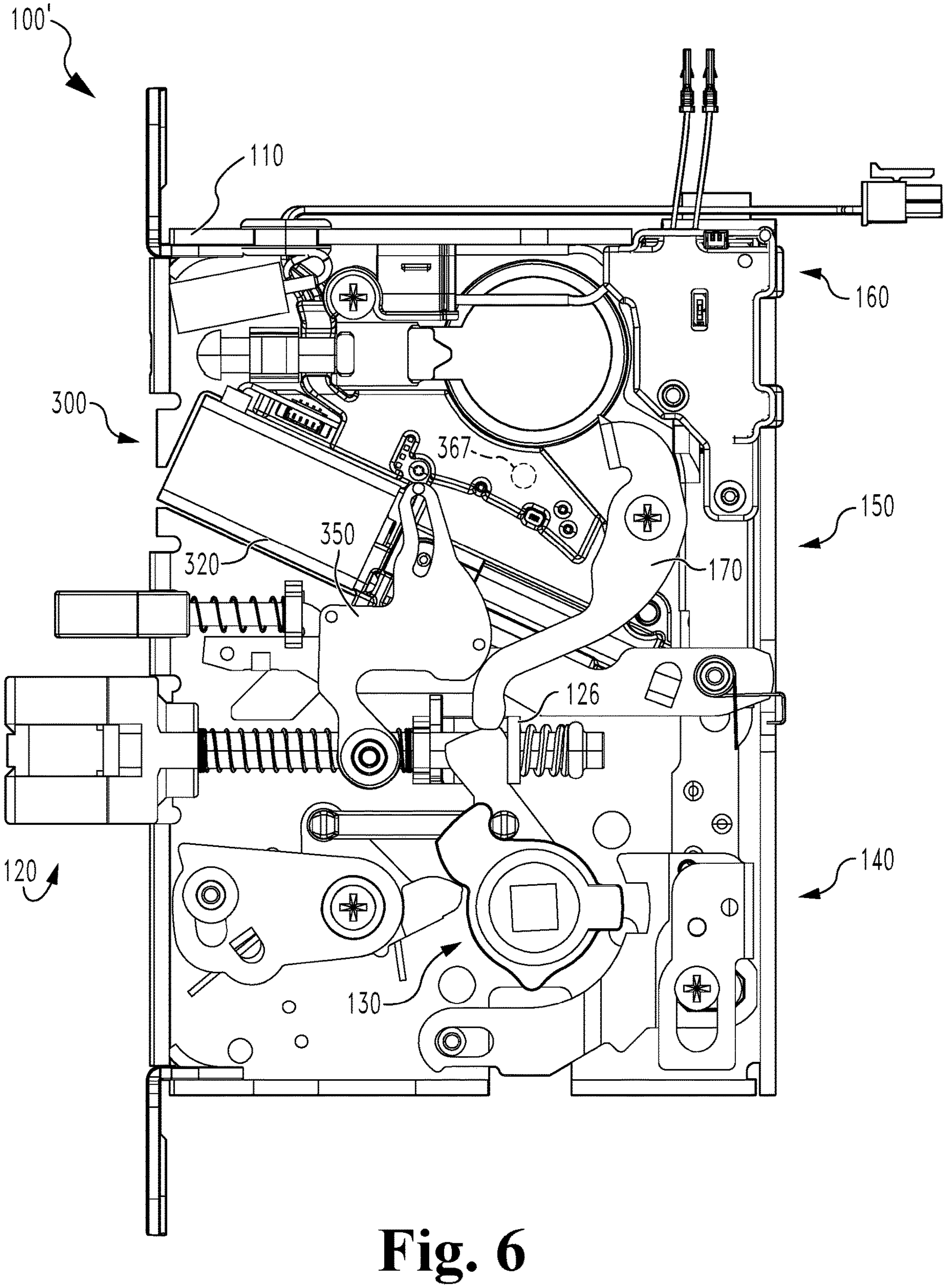
FIG. 6 is a plan view of a mortise chassis including a latch retraction assembly according to certain embodiments.

With additional reference to FIG. 6, illustrated therein is a mortise chassis 100' according to certain embodiments. The mortise chassis 100' is an embodiment of the above-described mortise chassis 100, and includes a latch retraction assembly 300 corresponding to the latch retraction assembly 190. As noted above, the latch retraction assembly 190/300 is operable to electronically extend and retract the latchbolt 120 in response to an extend/retract signal. As described herein, the illustrated latch retraction assembly 300 is configured to pivot the retraction lever 170 between a first retraction lever position and a second retraction lever for retraction and extension of the latchbolt 120.

Figure 7:
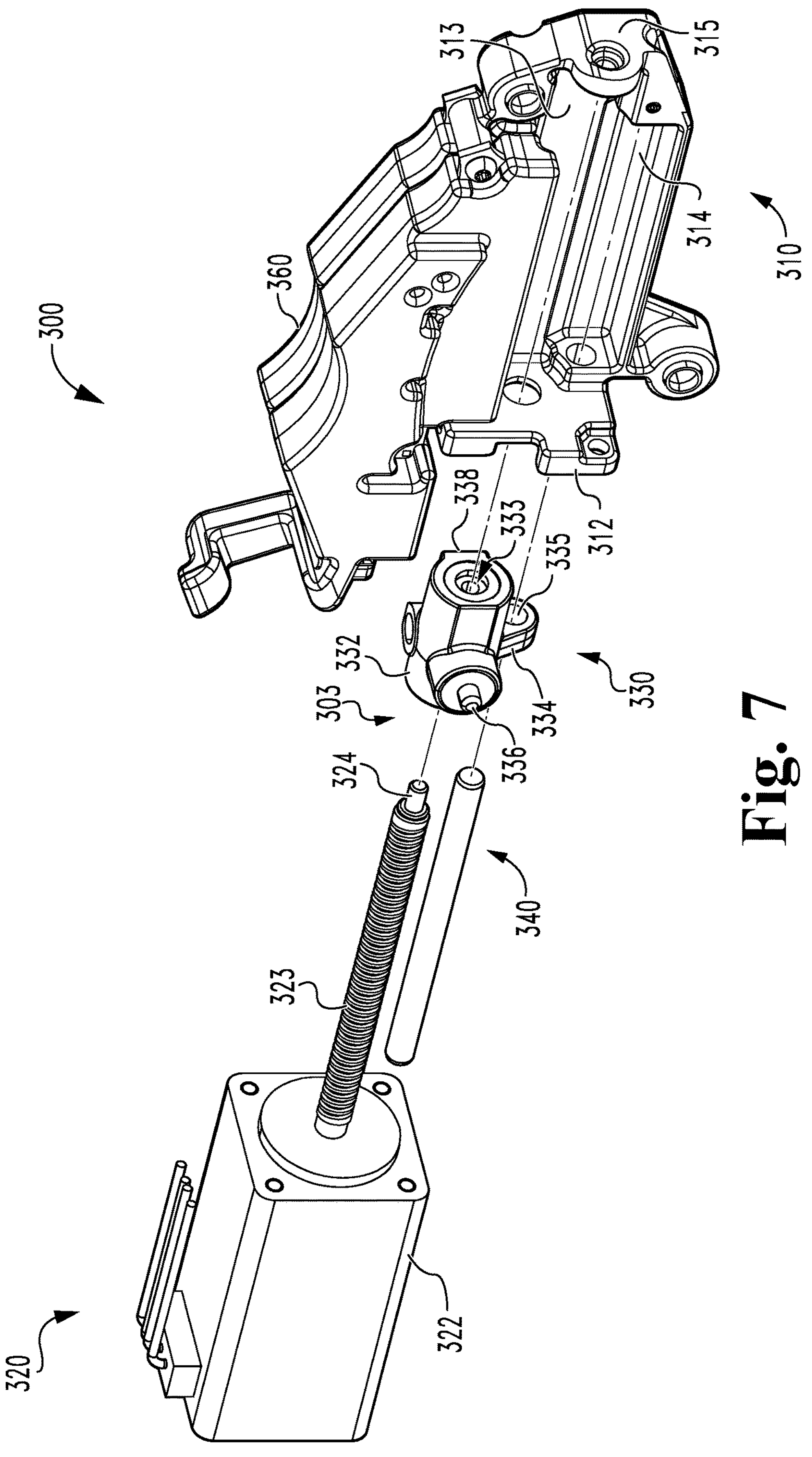
FIG. 7 is an exploded assembly view of the latch retraction assembly illustrated in FIG. 6.

With additional reference to FIG. 7, the latch retraction assembly 300 generally includes a mounting bracket 310, a motor 320 mounted to the mounting bracket 310, a drive nut 330 mounted to a lead screw 323 of the motor 320, a support rod 340 mounted to the mounting bracket 310 and preventing rotation of the drive nut 330, and an actuation plate in the form of an actuation lever 350, which is pivotably mounted to the housing 110. In certain embodiments, the latch retraction assembly 300 may include a control assembly 360, which may include a controller 362 and/or an energy storage device 366. In certain embodiments, the control assembly 360 may be in addition to the control assembly 160 that controls operation of the drive assembly 150. It is also contemplated that the control assembly 360 may be considered to constitute a portion of the control assembly 160. For example, the controller 362 may correspond to the controller 162, and the energy storage device 366 may correspond to the energy storage device 166.

As described herein, the actuation lever 350 is engaged with the drive nut 330 such that movement of the drive nut

330 from a first drive nut position to a second drive nut position pivots the actuation lever 350 from a first actuation lever position to a second actuation lever position. The actuation lever 350 is operable to engage the retraction lever 170 such that movement of the actuation lever 350 from the first actuation lever position to the second actuation lever position drives the retraction lever 170 from the first retraction lever position to the second retraction lever position, thereby retracting the latchbolt 120.

The mounting bracket 310 is configured for mounting within the housing 110, and generally includes an end wall 312 coupled to a body 322 of the motor 320, a first channel 313 extending away from the end wall 312, and a second channel 314 adjacent the first channel 313. The first channel 313 accommodates the lead screw 323 of the motor 320, and the second channel 314 accommodates the support rod 340. As described herein, the illustrated drive nut 330 is mounted for sliding movement relative to the mounting bracket 310, and is partially accommodated in each of the channels 313, 314.

The motor 320 generally includes a body portion 322 and a lead screw 323 extending from the body portion 322. The body portion 322 is secured to the end wall 312, and the lead screw 323 extends along the first channel 313. In certain embodiments, the tip 324 of the lead screw 323 is rotatably supported by an end wall 315 of the first channel 313. The lead screw 323 is externally threaded, and the threads of the lead screw 323 mesh with an internally threaded bore 333 of the drive nut 330. The motor 320 is operable to rotate the lead screw 323 in first and second rotational directions to thereby advance and retreat the drive nut 330.

As described herein, the motor 320 is operable in each of a latch retracting mode and a latch extending mode. In the latch retracting mode, the motor 320 rotates the lead screw 323 in a first rotational direction to move the drive nut 330 in a first linear direction, which causes retraction of the latchbolt 120 as described herein. In the latch extending mode, the motor 320 rotates the lead screw 323 in a second rotational direction opposite the first rotational direction to drive the drive nut 330 in a second linear direction opposite the first linear direction, which causes extension of the latchbolt 120 as described herein. While other forms of motor are contemplated, in the illustrated form, the motor 320 may be provided as a stepper motor.

The drive nut 330 generally includes a body portion 332 engaged with the lead screw 323 via a threaded engagement 303, a wing 334 engaged with the support rod 340, and a projection 336 that interfaces with the actuation lever 350. The body portion 332 includes an internally threaded bore 333 that receives the lead screw 323 and meshes with the external threads of the lead screw 323. In certain embodiments, the body portion 332 may include a flat 338 that interfaces with a floor 318 of the first channel 313 to aid in preventing the drive nut 330 from rotating with the lead screw 323. The wing 334 includes a bore 335 through which the support post 340 extends such that the support post 340 acts as a torque arrestor and prevents the drive nut 330 from rotating with the lead screw 323. As a result, rotation of the lead screw 323 in the first and second rotational directions drives the drive nut 330 in the first and second linear directions between the first drive nut position and the second drive nut position. As described herein, the projection 336 extends into a slot 356 of the actuation lever 350 such that the actuation lever 350 pivots between the first actuation lever position and the second actuation lever position in response to movement of the drive nut 330 between the first drive nut position and the second drive nut position.

In certain embodiments, the drive nut 330 may include a magnet that interacts with a Hall effect sensor 163 of the control assembly 160 to facilitate the movement of the drive nut 330 between its first and second positions. For example, the Hall effect sensor 163 may detect approach of the magnet, and cause the motor 320 to cease rotation of the lead screw 323 upon detection of the magnet. In certain embodiments, the control assembly 160 may include a first Hall effect sensor 163 to detect the first position of the drive nut 330, and a second Hall effect sensor 163 to detect the second position of the drive nut 330.

The support post 340 is mounted to the mounting bracket 310 within the second channel 314, and extends through the bore 335 in the wing 334 of the drive nut 330. Those skilled in the art will readily recognize that, due to friction and other forces, rotation of the lead screw 323 in either direction will exert a torque tending to rotate the drive nut 330 in the direction of rotation of the lead screw 323. Left unchecked, the drive nut 330 would simply rotate with the lead screw 323 without linear movement. While some of the torque may be counteracted by engagement of the flat 338 with the floor 318 of the first channel 313, it may be desirable to provide additional torque resistance. Accordingly, the support post 340 may be utilized as an additional or alternative torque arrestor to ensure that rotation of the lead screw 323 is translated to linear movement of the drive nut 330.

Figure 8:
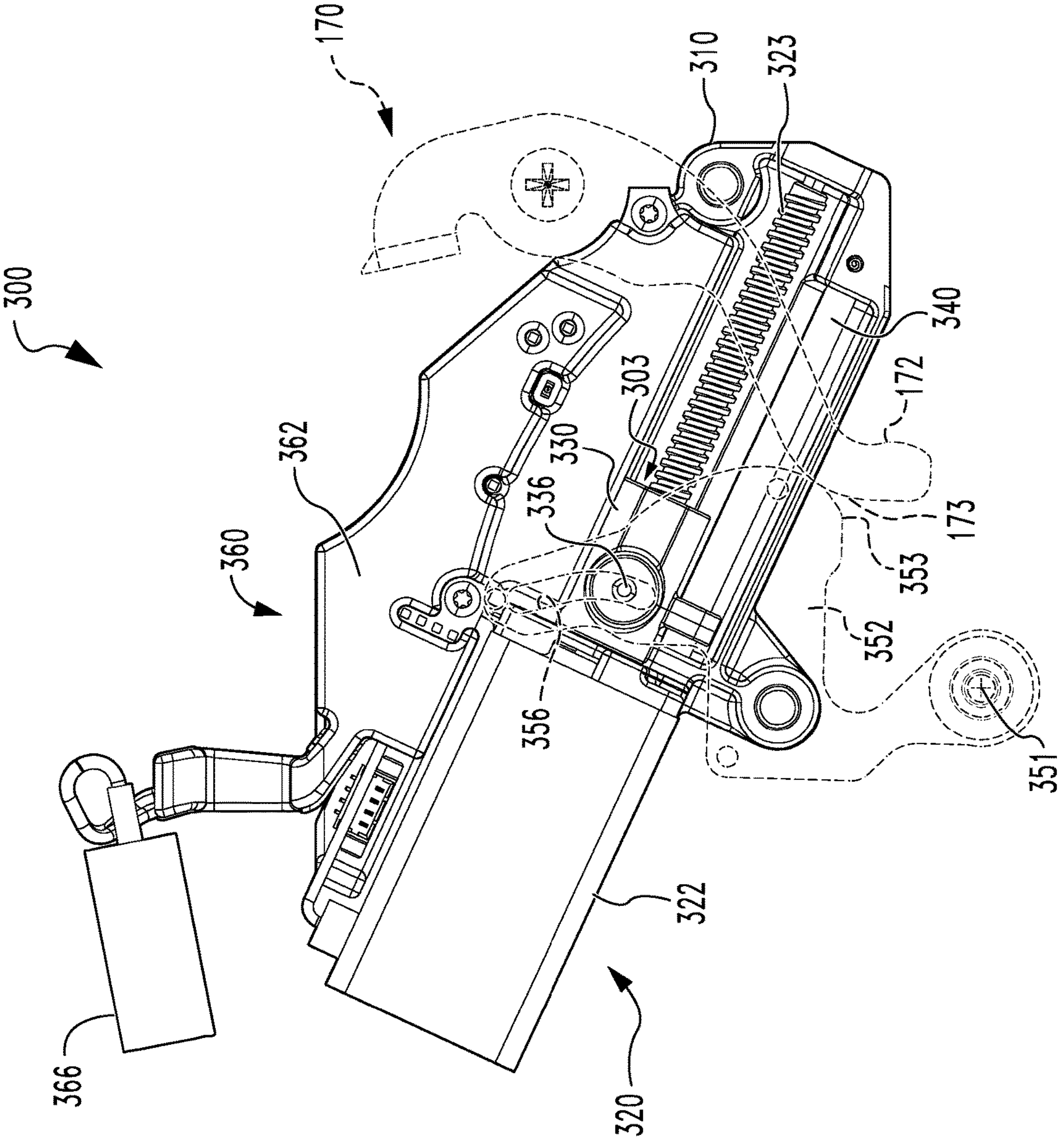
FIG. 8 is a plan view of the latch retraction assembly illustrated in FIG. 6.

With additional reference to FIG. 8, the illustrated actuation lever 350 is mounted in the housing 110 for pivotal movement about a pivot axis 351 between a first actuation lever position (FIG. 9) and a second actuation lever position (FIG. 10). The actuation lever 350 generally includes a body portion 352 having a bearing surface 353, which interfaces with a corresponding bearing surface 173 of the arm 172 of the retraction lever 170 to thereby drive the retraction lever 170 between the first retraction lever position and the second retraction lever position in response to movement of the actuation lever 350 between the first actuation lever position and the second actuation lever position. The actuation lever 350 further includes a curved slot 356 that receives the projection 336 of the drive nut 330 such that the actuation lever 350 pivots between the first actuation lever position and the second actuation lever position in response to linear movement of the drive nut 330 between the first drive nut position and the second drive nut position.

The control assembly 360 may include a controller 362, and/or an energy storage device 366. In certain embodiments, the control assembly 360 may be in addition to the control assembly 160 that controls operation of the drive assembly 150. It is also contemplated that the control assembly 360 may be considered to constitute a portion of the control assembly 160. For example, the controller 362 may correspond to the controller 162, and the energy storage device 366 may correspond to the energy storage device 166. In certain forms, the chassis 100' may include a single controller that controls both the lock/unlock function (e.g., by controlling the drive assembly 150) and the latch/unlatch function (e.g., by controlling the latch retraction mechanism 190/300). In other embodiments, the chassis 100' may include plural controllers. For example, the chassis 100' may include a first controller configured to control the lock/unlock function, and a second controller to control the latch/unlatch function. In such forms, the two controllers may be considered to constitute two portions of a control assembly, such as the control assembly 160.

Figure 9:
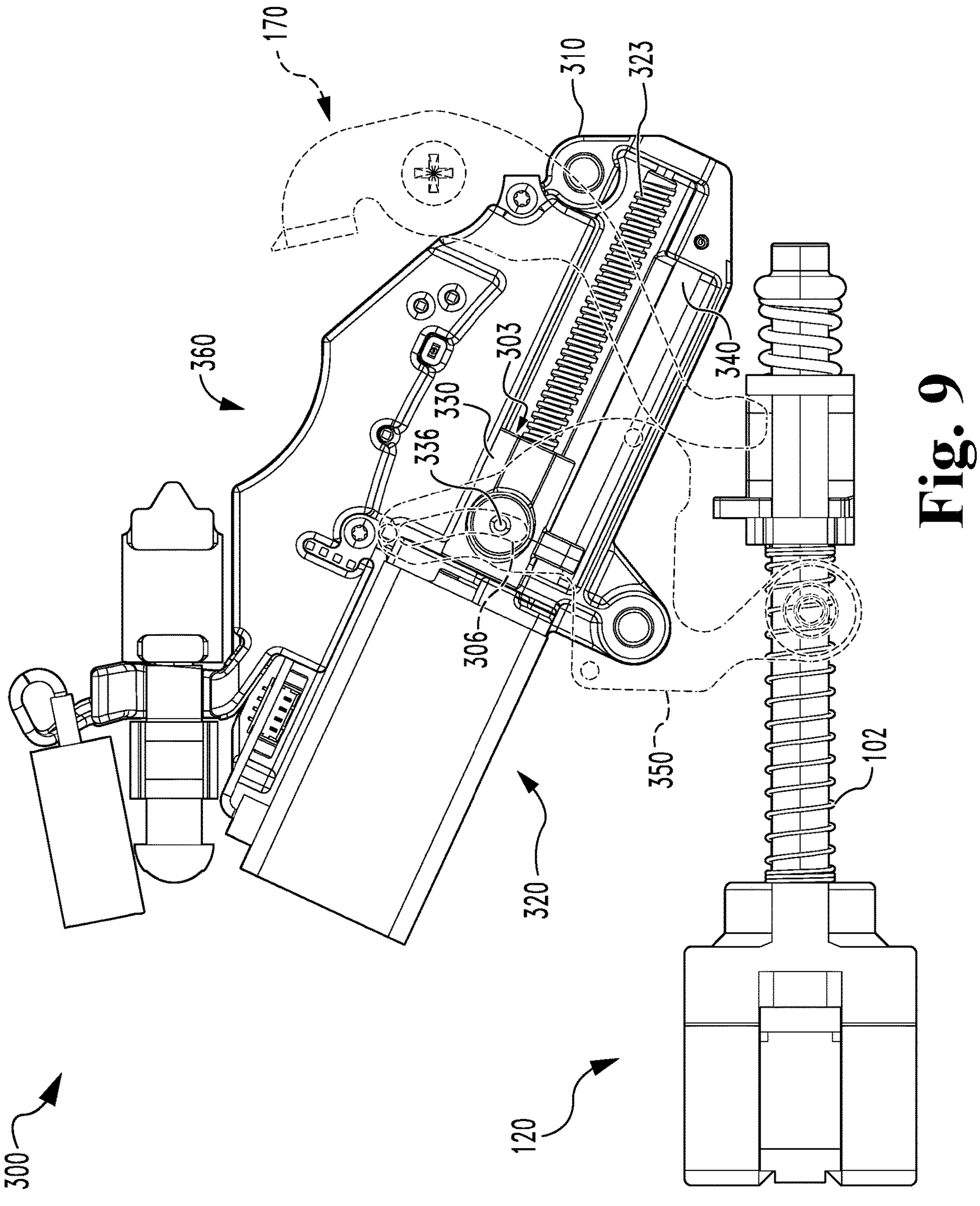
FIG. 9 is a plan view illustrating a portion of the mortise chassis with the latch retraction assembly in a first or non-retracting state.

With additional reference to FIGS. 9 and 10, illustrated therein are selected components of the mortise chassis 100' in a first state (FIG. 9) and a second state (FIG. 10). With the chassis 100' in its first state (FIG. 9), the latch retraction assembly 300 is in a non-retracting state, in which the latch retraction assembly 300 does not retain the latchbolt 120 in its retracted position. With the chassis 100' in its second state (FIG. 10), the latch retraction assembly 300 is in a retracting state, in which the latch retraction assembly 300 retains the latchbolt 120 in its retracted position as described herein.

As noted above, FIG. 9 illustrates the chassis 100' in its first state. With the chassis 100' in the first state, the latch retraction assembly 300 is in its first or non-retracting state, in which the lead screw 323 retains the drive nut 330 in the first drive nut position and thereby retains the actuation lever 350 in the first actuation lever position. As a result, the actuation lever 350 permits the retraction lever 170 to remain in the first retraction lever position, in which the retraction lever 170 does not force retraction of the latchbolt 120. The latchbolt 120 thus remains free to be mechanically moved between its extended and retracted positions by the hub 130 (e.g., in response to rotation of the handle 92). As such, when the latch retraction assembly 300 is in its first or non-retracting state, the latch retraction assembly 300 does not retain the latchbolt 120 in its retracted position.

The chassis 100' may be moved from the first state to the second state by transitioning the latch retraction assembly 300 from its non-retracting state to its retracting state. This may involve the control assembly 160/360 transmitting to the latch retraction assembly 300 a retract signal, for example as described below with reference to the process 220 illustrated in FIG. 11. In response to the retract signal, the motor 320 rotates the lead screw 323 in the first rotational direction, thereby driving the drive nut 330 in the first linear direction toward the second drive nut position (FIG. 10). As the drive nut 330 moves toward the second drive nut position, engagement between the projection 336 and the slot 356 causes the actuation lever 350 to pivot toward the second actuation lever position. Such pivoting of the actuation lever 350 causes the retraction lever 170 to pivot toward the second actuation lever position, thereby retracting the latchbolt 120.

As noted above, FIG. 10 illustrates the chassis 100' in its second state. With the chassis 100' in the second state, the latch retraction assembly 300 is in its second or retracting state, in which the lead screw 323 retains the drive nut 330 in the second drive nut position and thereby retains the actuation lever 350 in the second actuation lever position. As a result, the actuation lever 350 retains the retraction lever 170 in the second actuation lever position, thereby retaining the latchbolt 120 in the retracted position against the biasing force of the spring 102. As such, when the latch retraction assembly 300 is in its second or retracting state, the latch retraction assembly 300 retains the latchbolt 120 in its retracted position.

Those skilled in the art will readily appreciate that when the chassis 100' is in the second state, the biasing force of the spring 102 urges the latchbolt 120 to return toward its extended position. This biasing force is transmitted to the drive nut 330 through the retraction lever 170 and the actuation lever 350, such that the actuation lever 350 urges the drive nut 330 to return to the first drive nut position by traveling in the second linear direction. As described herein, however, this force does not result in movement of the drive nut 330 toward the first drive nut position due at least in part to the form of engagement between the lead screw 323 and the drive nut 330.

In the illustrated form, the threaded engagement 303 between the lead screw 323 and the drive nut 330 may be self-dogging. For example, one or more characteristics of the threaded engagement 303 (e.g., pitch, helix angle, thread angle, material, and/or lubricity) may be selected such that the lead screw 323 is operable to rotate in order to drive the drive nut 330 linearly, but the drive nut 330 is inoperable to move linearly in order to rotate the lead screw 323. Stated another way, the lead screw 323 is operable to move the drive nut 330, but the drive nut 330 is inoperable to rotate the lead screw 323. As a result, the biasing force of the return spring 102 is counteracted by the threaded engagement 303 between the lead screw 323 and the drive nut 330, which prevents the spring 102 from returning the chassis 100' to its first state. The latch retraction assembly 300 may thus be considered self-dogging, as the latch retraction assembly 300 cannot be moved from the retracting state to the non-retracting state by the internal biasing forces of the chassis 100'.

The chassis 100' may be moved from the first state to the second state by transitioning the latch retraction assembly 300 from its non-retracting state to its retracting state. In embodiments in which the latch retraction assembly 300 is configured to self-dog to remain in the retracting state, the motor 320 may need to be driven once again to return the latch retraction assembly 300 to the non-retracting state. This may involve the control assembly 160/360 transmitting to the latch retraction assembly 300 a return signal, for example as described below with reference to the process 220 illustrated in FIG. 11. In response to the return signal, the motor 320 rotates the lead screw 323 in the second rotational direction, thereby driving the drive nut 330 in the second linear direction toward the first drive nut position (FIG. 9). As the drive nut 330 moves toward the first drive nut position, engagement between the projection 336 and the slot 356 causes the actuation lever 350 to pivot toward the first actuation lever position. Such pivoting of the actuation lever 350 permits the retraction lever 170 to pivot toward the first actuation lever as the latchbolt 120 returns to the extended position under the biasing force of the spring 102.

Figure 11:
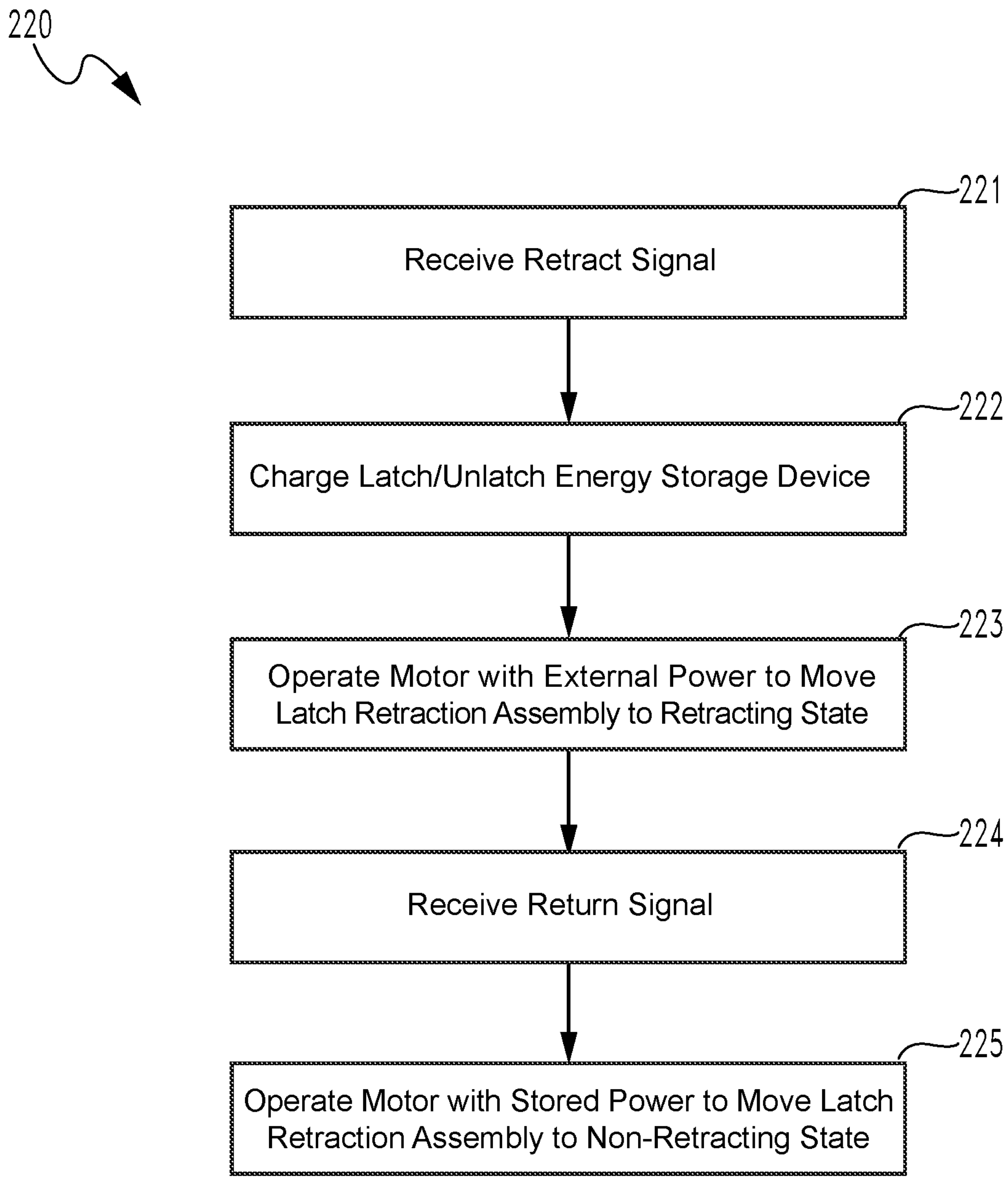
FIG. 11 is a schematic flow diagram of a process according to certain embodiments.

With additional reference to FIG. 11, an exemplary latch/unlatch procedure 220 that may be performed using the chassis 100' is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the procedure 220 is described herein with specific reference to the chassis 100' illustrated in FIGS. 6-10, it is to be appreciated that the procedure 210 may be performed with a lockset or chassis having additional or alternative features.

The procedure 220 may begin with the chassis 100' in a first state, such as the first state illustrated in FIG. 9. In this state, the control assembly 160/360 may be receiving (e.g., from the external device 70) a return command, such as a particular signal or absence of a retract command. The procedure 220 may include block 221, which includes receiving, by the control assembly 160/360, a retract command (e.g., from the external device 70). For example, block 221 may include receiving power in excess of a predetermined threshold. In certain embodiments, presence of the power may be interpreted as the retract command, and absence of the power may be interpreted as the extend command.

In response to receiving the retract command in block 221, the procedure 220 may continue to block 222, which generally involves storing electrical energy in an energy storage device 166/366. For example, block 221 may involve storing energy in the latch/unlatch energy storage device 166, which may be provided as the energy storage device 366. As described herein, the energy to be stored in block 222 should be sufficient to cause the motor 320 to return the latch retraction assembly 300 to its first or non-retracting state (FIG. 9) following movement of the latch retraction assembly 300 to its second or retracting state (FIG. 10).

Once a threshold amount of electrical energy has been stored in the latch/unlatch energy storage device 166/366, the procedure 220 may continue to block 223, which generally involves operating the motor 320 with external power to move the latch retraction assembly 300 to its second state. As noted above, this movement retracts the latchbolt 200, thereby transitioning the chassis 100' to its second state (FIG. 10).

After transitioning the chassis 100' to its second state in block 223, the control assembly 160/360 may receive a return command in block 224. For example, the external device 70 may cease transmitting the power that is interpreted as the retract command, or may transmit the return command in another manner. In response to receiving the return command (e.g., the lack of power) in block 224, the procedure 220 may continue to block 225, which generally involves returning the chassis 100' to its first state in response to the return command. More particularly, block 225 involves operating the motor 320 with the energy stored in the latch/unlatch energy storage device 166/366 to thereby move the latch retraction assembly 300 to its non-retracting state, thereby causing the latchbolt 120 to extend as described above.

As noted above, while certain existing mortise locksets may include a motor that aids in retracting a latchbolt, these locksets typically utilize relatively large motors that project from the mortise chassis and/or require additional door preparation, each of which can be undesirable in at least some circumstances. In the illustrated form, however, the motor 320 may be relatively small such that further modification of the door (i.e., modification beyond the standard door preparation) is not required. As described herein, one or more features utilized in the system may facilitate the use of smaller motors.

As previously noted, certain existing mortise locksets utilize relatively large motors that project from the case of the mortise chassis. These larger motors can typically be run simply by turning the motor on and off. If smaller motors are to be utilized, however, it may be advantageous to employ acceleration and/or deceleration profiles in place of the simple ON/OFF control used in conventional systems. As will be appreciated, an acceleration (or deceleration) profile may increase (or decrease) the rotary speed of the motor relatively gradually by providing a ramp time over which the speed increases (or decreases). In certain embodiments, the rotary speed of the motor may increase rectilinearly over the ramp time, while in other embodiments, the rotary speed profile may be at least partially curvilinear. In various embodiments, the ramp time may be at least 10 milliseconds, at least 50 milliseconds, or at least 100 milliseconds. It has been found that the use of an acceleration profile can facilitate the use of a smaller motor while still providing the power output of a larger motor. It has also been found that the use of a deceleration profile can reduce the stopping forces in the mechanical components, which can help improve the fatigue life of the motor and other components of the lockset.

In certain forms, the control assembly 160/360 may cause the motor 320 to run for a predetermined time period selected to permit the motor 320 to cause a full retraction of the latchbolt 120. However, it has been found that if the motor 320 were to stall while under time-based control, the user would need to wait the entire predetermined time period before again attempting to retract the latchbolt 120. For example, if the motor 320 takes 0.5 seconds to completely retract the latchbolt 120, but the motor 320 stalls at 0.1 seconds, the subsequent attempt to retract the latch will happen only after the initial 0.5 seconds have passed, which can result in longer latch retraction time in the event of a motor stall. Accordingly, certain embodiments of the present application may implement stall detection to determine if and when the motor 320 stalls. In the event of such a stall, the retraction attempt can be performed relatively quickly without the need to wait for a predetermined time period.

In certain embodiments, the motor 320 may be operated in a single power mode such that the nominal operating power is not adjustable. However, it has been found that operating at full power can have one or more disadvantages. For example, operating at full power can place unnecessary stresses on the components, and draws high current/power from the power supply at all times. This can also limit the total number of locks that can be connected to a single power supply if the lock motor is not running at full capacity.

In light of the foregoing, it may be advantageous in certain embodiments to utilize a low-power and high-power mode, and selectively switch between the modes to optimize performance while minimizing adverse effects. For example, the chassis 100 may be placed in the low-power mode at the time of delivery to the end user. Once installed, the lock attempts to retract the latchbolt 120 in low-power mode. If the lock stalls at low-power mode, the control assembly 160/360 switches to high-power mode and monitors a predetermined number of subsequent cycles, monitoring the power drawn by the motor 320 during such cycles. If a predetermined number of the cycles (e.g., any three of the subsequent five cycles) happen to require the high-power mode, the lock defaults to high-power mode for a greater number of cycles, such as the next fifty cycles. Once those cycles have completed, the control assembly 160/360 will switch back down to low-power mode. Based on whether the motor 320 retracts the latchbolt 120 without stalling in the low-power mode, the control assembly 160/360 may default to the low-power mode or continue with the high-power mode. In the event that low-power mode is selected, the control assembly 160/360 again checks for subsequent stall cycles (e.g., checks for stalling in any three of the next five cycles). In high power mode, the control assembly 160/360 may retry for five subsequent cycles, with the fifth cycle at an even higher power then the default high-power mode. If all five cycles fail, the control assembly 160/360 may stop retrying for a predetermined time period (e.g., thirty seconds), and attempts to retract the latchbolt 120 every thirty seconds after that until power is removed.

As will be appreciated, the motor 320 may require higher power to extend the latchbolt 120 when ambient temperatures drop, particularly as temperatures approach −20° C. and go below. In certain forms, the control assembly 160/360 may include a temperature sensor 169, and switch to higher-power mode for latch extension only when temperature drops below −15° C. Switching to the higher-power mode at low temperatures may help improve the life of the energy storage device(s) 164 when such high power is not required.

Due to various factors, including part-to-part variation and tolerance stack-ups, each individual lock will have its own start and end points for latch retraction. In certain embodiments, the motor 320 may simply be run for a predetermined time period beyond the time required to fully retract the latchbolt 120. However, this can add unnecessary stress to the motor 320 and related components, which can reduce the useful life of such components. In order to avoid such drawbacks, certain embodiments may utilize a calibration mode. In such forms, the control assembly 160/360 may enter a calibration mode upon the first lock power-up. In calibration mode, the control assembly 160/360 drives the motor 320 to retract the latchbolt 120, detects the triggering of the Hall effect sensor(s) 163, and counts the number of motor rotations until reaching stall (which indicates complete latch retraction). The number of rotations from triggering of the sensor 163 until stall of the motor 320 is unique to each lock unit, and is stored in memory. The motor 320 is then reversed to trigger the latch extension side sensor 163, counts the number of motor rotations until motor stall, and stores this value for later use as well.

In certain embodiments, the latch retraction assembly 300 may be configured to operate at a single voltage, such as 12 Volts or 24 Volts. It is also contemplated that the latch retraction assembly 300 may be capable of operating with each and either of 12V power and 24V power. In certain forms, the latch retraction assembly 300 may be configured to accept input power of either polarity.

In certain forms, the control assembly 360 may include a wireless communication device 367 corresponding to the above-described wireless communication device 167. In the illustrated form, the wireless communication device 367 is provided in the form of an infrared communication device that is aligned with the opening 117, thereby facilitating wireless communication with a peripheral device 60. It is also contemplated that other wavebands of electromagnetic radiation may be utilized, including but not limited to the visible waveband. The information communicated via the wireless communication device 367 may include information relating to a status of the chassis 100. For example, the status information may include information relating to the high-power/low-power operating state, the locked/unlocked state, the retracted/extended state of the latchbolt 120, and/or retraction failed conditions. As will be appreciated, information relating to these statuses may be relayed to the user via a status indicator 64, such as a visual status indicator.

Figure 12:
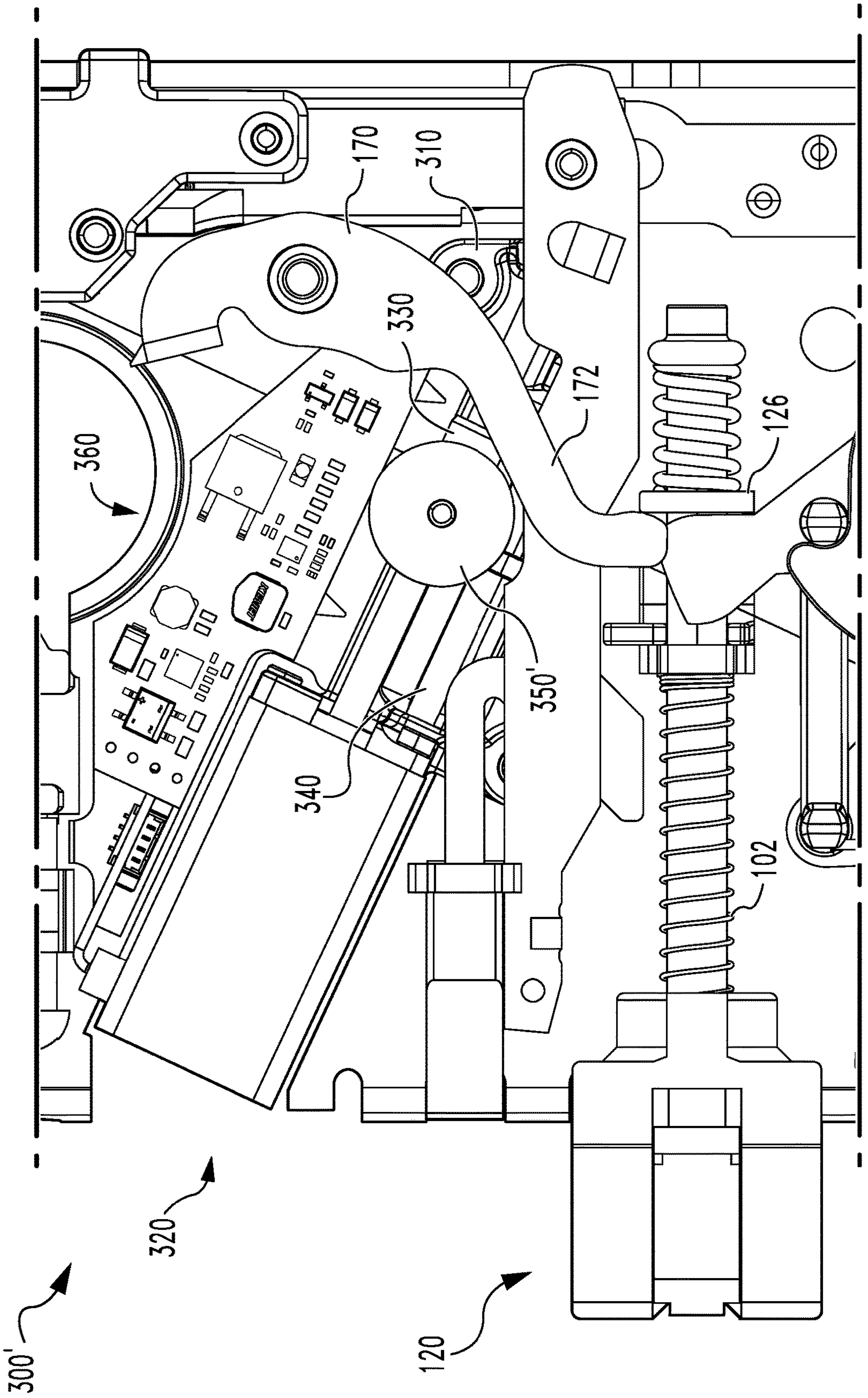
FIG. 12 is a plan view of a mortise chassis including a latch retraction assembly according to certain embodiments.

With additional reference to FIG. 12, illustrated therein is a latch retraction assembly 300' according to certain embodiments. The latch retraction assembly 300' is substantially similar to the above-described latch retraction assembly 300, and includes the mounting bracket 310, the motor 320, the drive nut 330, the support rod 340, and the control assembly 360, each of which functions substantially as described above. The latch retraction assembly 300' also includes an actuating plate in the form of an actuating roller 350', which is rotatably mounted to the protrusion 336 of the drive nut 330. In the interest of conciseness, the following description of the latch retraction assembly 300' focuses primarily on elements and features that are different from those described above with reference to the latch retraction assembly 300.

As indicated above, the actuation plate of the latch retraction assembly 300' is provided in the form of an actuation roller 350', which is rotatably mounted to the drive nut 330. The actuation roller 350' is operable to engage and roll along the arm 172 of the retraction lever 170 as the drive nut 330 moves from the first drive nut position to the second drive nut position to thereby cause the retraction lever 170 to pivot from the first retraction lever position to the second retraction lever position for retraction of the latchbolt 120 as described above. As the motor 320 returns the drive nut 330 from the second drive nut position to the first drive nut position, the spring 102 returns the latchbolt 120 to its extended position, thereby causing the bracket 126 to return the retraction lever 170 to the first retraction lever position.

Figure 13:
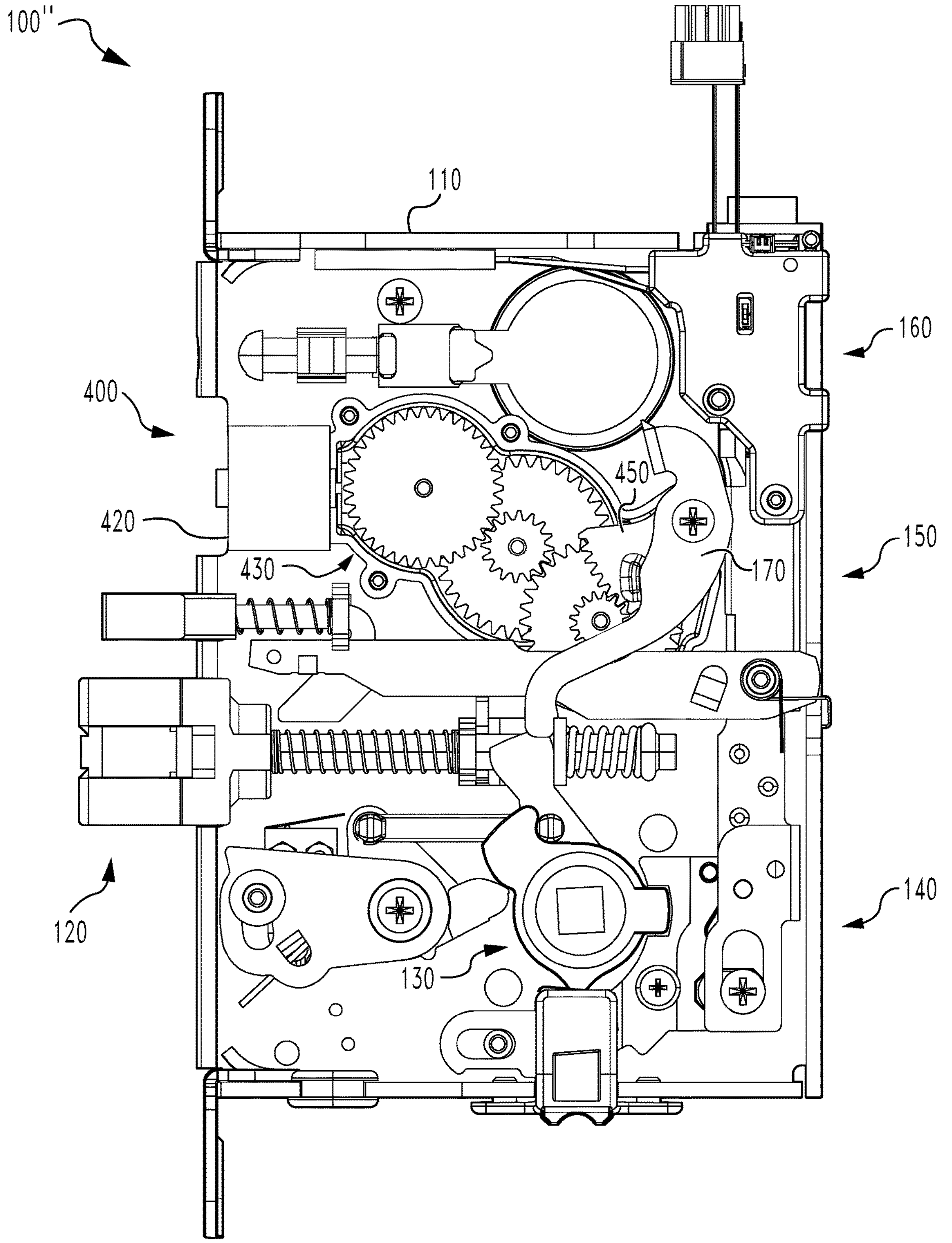
FIG. 13 is a plan view of a mortise chassis including a latch retraction assembly according to certain embodiments.

With additional reference to FIG. 13, illustrated therein is a mortise chassis 100" according to certain embodiments. The mortise chassis 100" is an embodiment of the above-described mortise chassis 100, and includes a latch retraction assembly 400 corresponding to the latch retraction assembly 190. As noted above, the latch retraction assembly 190/400 is operable to electronically extend and retract the latchbolt 120 in response to an extend/retract signal. As described herein, the illustrated latch retraction assembly 400 is configured to pivot the retraction lever 170 between the first retraction lever position and the second retraction lever for retraction and extension of the latchbolt 120.

Figure 14:
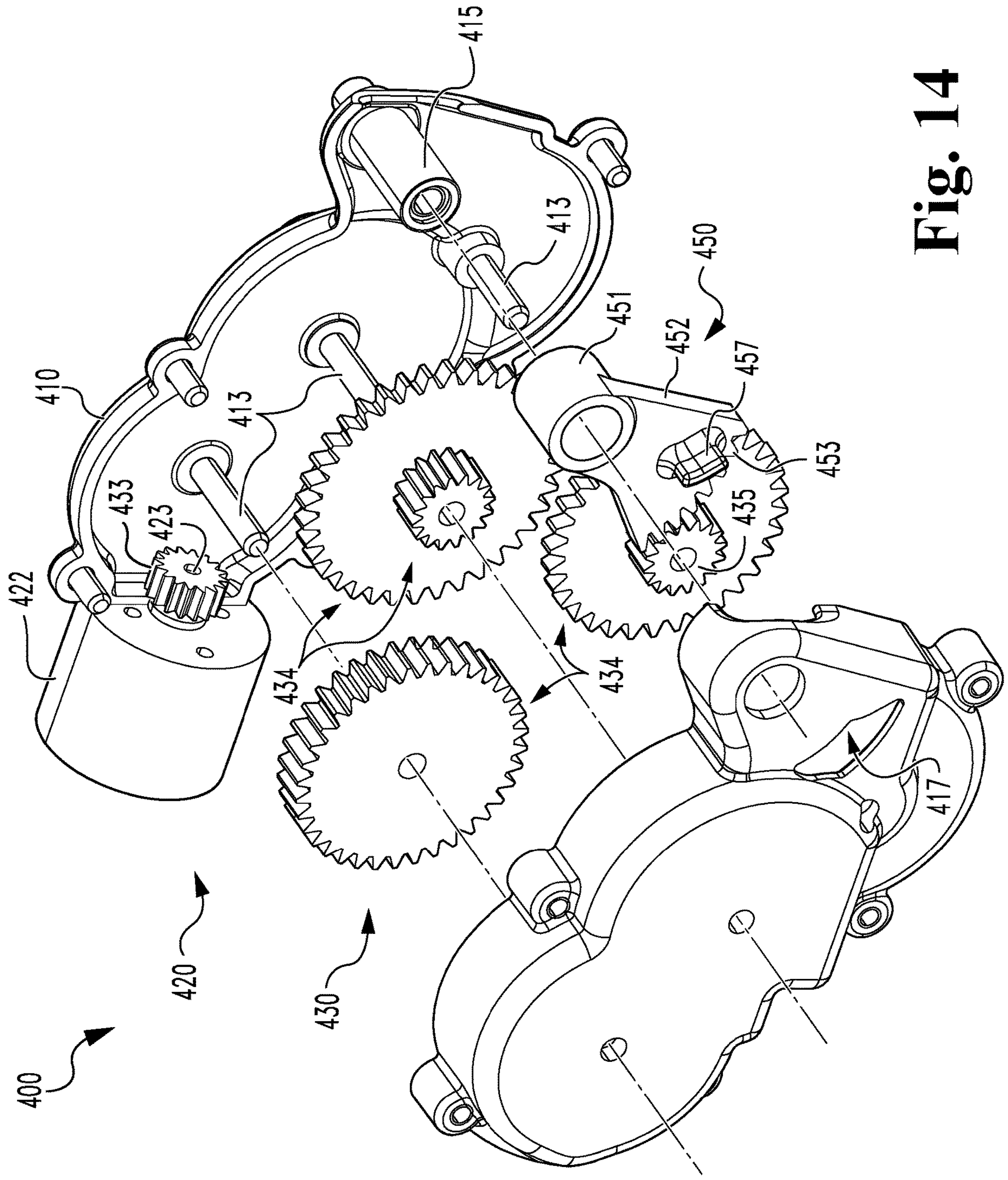
FIG. 14 is an exploded perspective view of the latch retraction assembly shown in FIG. 13.

With additional reference to FIG. 14, the latch retraction assembly 400 generally includes a housing 410 for mounting in the housing 110, a motor 420 including a body portion 422 coupled to the housing 410, a gear train 430 operable to be driven by the motor 420, and an actuation lever 450 pivotably mounted in the housing 410 and operable to be driven by the gear train 430. While not specifically illustrated in FIG. 14, it should be appreciated that the latch retraction assembly 400 may include a control assembly, such as one along the lines of the above-described control assembly 360.

The housing 410 provides mounting locations for the remaining components of the latch retraction assembly 400, and in the illustrated form substantially encloses the components such that the latch retraction assembly 400 is operable to be installed to the mortise chassis 100" as a modular unit. The housing 410 may, for example, include one or more bearing posts 413 to which gears 434 of the gear train 430 are rotatably mounted, and/or a bearing post 415 to which the actuation lever 450 is pivotably mounted. The illustrated housing 410 is provided in two pieces, including a base 411 and a cover 412 coupled to the base 411. In the illustrated form, the cover 412 includes an aperture 417 through which a projection 457 of the actuation lever 450 projects for engagement with the retraction lever 170.

The motor 420 includes a body portion 422 coupled to the housing 410, and a motor shaft 423 coupled to an input gear 433 of the gear train 430. The motor 420 is configured to rotate the motor shaft 423 in opposite directions in response to a retract/return signal. More particularly, the motor 420 is configured to rotate the motor shaft 423 in a first rotational direction in response to a retract signal, and is configured to rotate the motor shaft 423 in an opposite second rotational direction in response to a return signal. As described herein, rotation of the motor shaft 423 in the first and second rotational directions causes the gear train 430 to pivot the actuation lever 450 between a first actuation lever position and a second actuation lever position for retraction of the latchbolt 120.

The gear train 430 generally includes an input gear 433 operable to be rotated by the motor 420, and an output gear 435 engaged with the actuation lever 450, and in the illustrated form further comprises one or more intermediate gears 434 connected between the input gear 433 and the output gear 435. As described herein, rotation of the motor shaft 423 in the first rotational direction causes the gear train 430 to drive the actuation lever 450 from a first actuation lever position (FIG. 15) to a second actuation lever position (FIG. 16) for retraction of the latchbolt 120, and rotation of the motor shaft 423 in the second rotational direction causes the gear train 430 to drive the actuation lever 450 from the second actuation lever position (FIG. 16) to the first actuation lever position (FIG. 15) for extension of the latchbolt 120.

Figure 15:
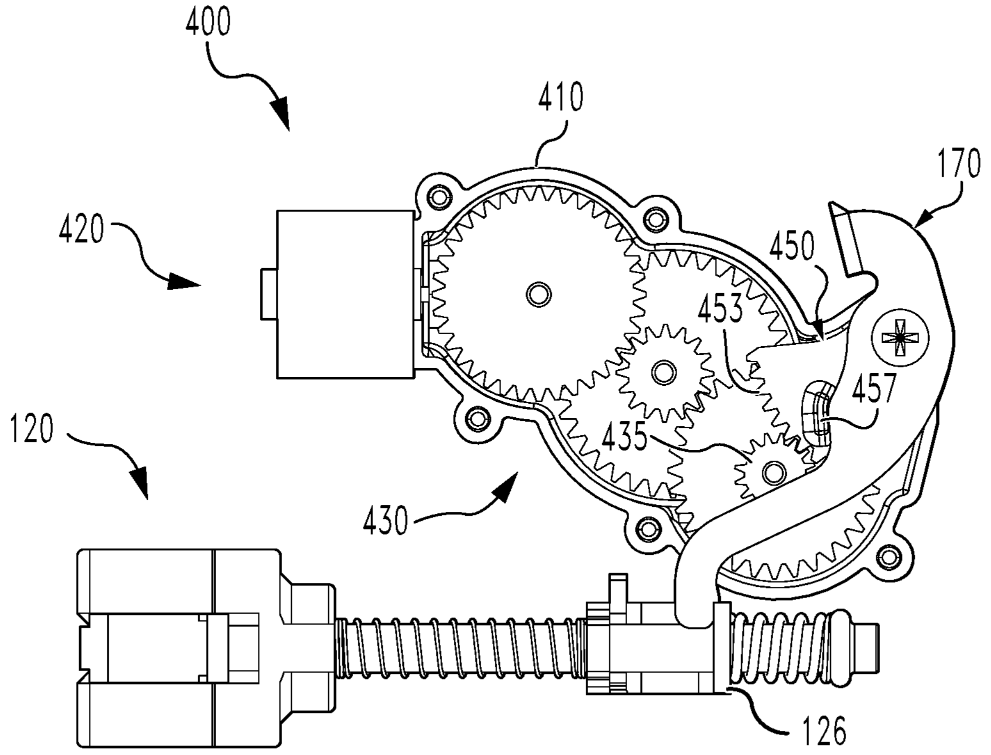
FIG. 15 is a plan view illustrating the latch retraction assembly shown in FIG. 13 while in a first or non-retracting state.
Figure 16:
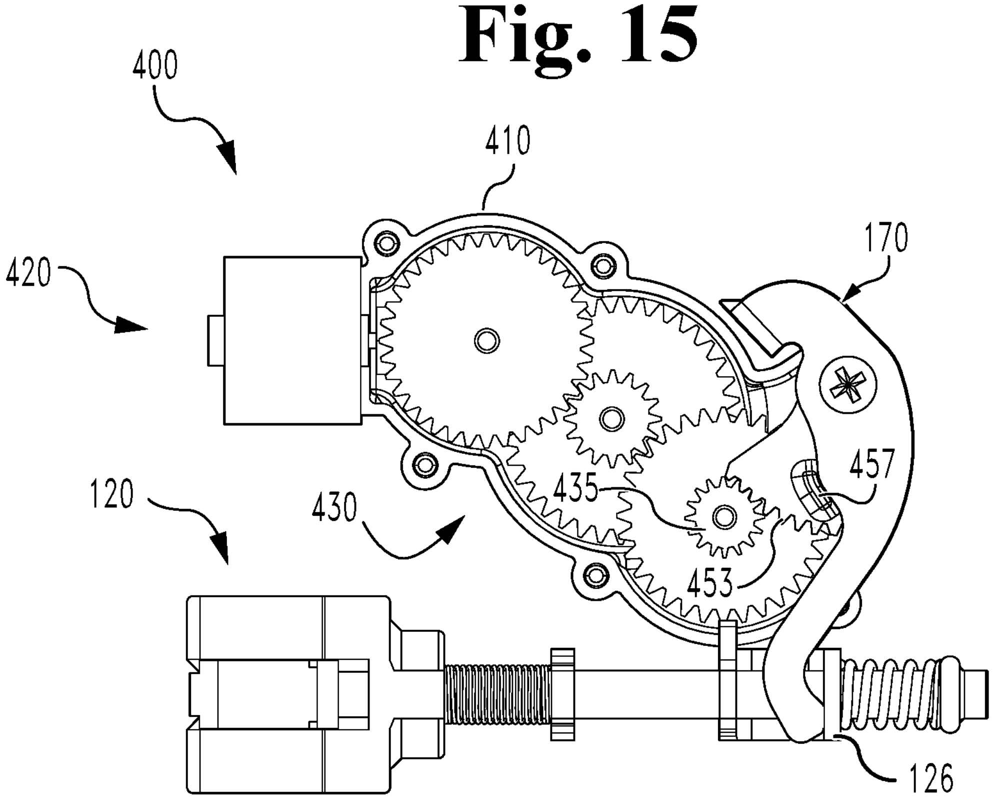
FIG. 16 is a plan view illustrating the latch retraction assembly shown in FIG. 13 while in a second or retracting state.

With additional reference to FIGS. 15 and 16, the actuation lever 450 is pivotably mounted in the housing 410 for pivotal movement between a first actuation lever position (FIG. 15) and a second actuation lever position (FIG. 16). The actuation lever 450 generally includes a body 451 pivotably mounted to the bearing post 415, and an extension 452 extending radially from the body 451. The extension 452 is provided with a partial gear or toothed region 453, which meshes with the output gear 435 such that the actuation lever 450 pivots between its first and second positions in response to rotation of the output gear 435 in opposite directions. The extension 452 is also provided with a projection 457 that projects through the opening 417 in the housing 410 for engagement with the retraction lever 170.

FIG. 15 illustrates the latch retraction assembly 400 in a first state, in which the actuation lever 450 is in the first actuation lever position. In this state, the actuation lever 450 permits the retraction lever 170 to adopt the first retraction lever position, and the latchbolt 120 is extended. It should be noted that in this state, the latch retraction assembly 400 does not interfere with manual retraction of the latchbolt 120. For example, if the hub 130 were rotated with the latch retraction assembly 400 in its first state, the retractor 104 would drive the bracket 126 rearward without interference from the latch retraction assembly 400 and/or the retraction lever 170. As such, the mortise chassis 100" remains capable of manual actuation for conventional retraction of the latchbolt 120.

As noted above, the motor 420 is configured to rotate the motor shaft 423 in a first rotational direction in response to a retract signal. Such rotation of the motor shaft 423 causes the gear train 430 to pivot the actuation lever 450 from the first actuation lever position (FIG. 15) to the second actuation lever position (FIG. 16). As the actuation lever 450 pivots from its first position to its second position, the projection 457 engages the retraction lever arm 172 to thereby drive the retraction lever 170 from its first position to its second position. As a result, the arm 172 drives the bracket 126 rearward for retraction of the latchbolt 120.

FIG. 16 illustrates the latch retraction assembly 400 in a second state, in which the actuation lever 450 is in the second actuation lever position. In this state, the actuation lever 450 holds the retraction lever 170 in the second retraction lever position, thereby retaining the latchbolt 120 in its extended position.

As noted above, the motor 420 is configured to rotate the motor shaft 423 in a second rotational direction in response to an extend signal. Such rotation of the motor shaft 423 causes the gear train 430 to pivot the actuation lever 450 from the second actuation lever position (FIG. 16) to the first actuation lever position (FIG. 15). As the actuation lever 450 pivots from its second position to its first position, the projection 457 moves away from the arm 172, thereby permitting the retraction lever 170 to return to its first position as the latchbolt 120 extends under the biasing force of the spring 102.

Figure 17:
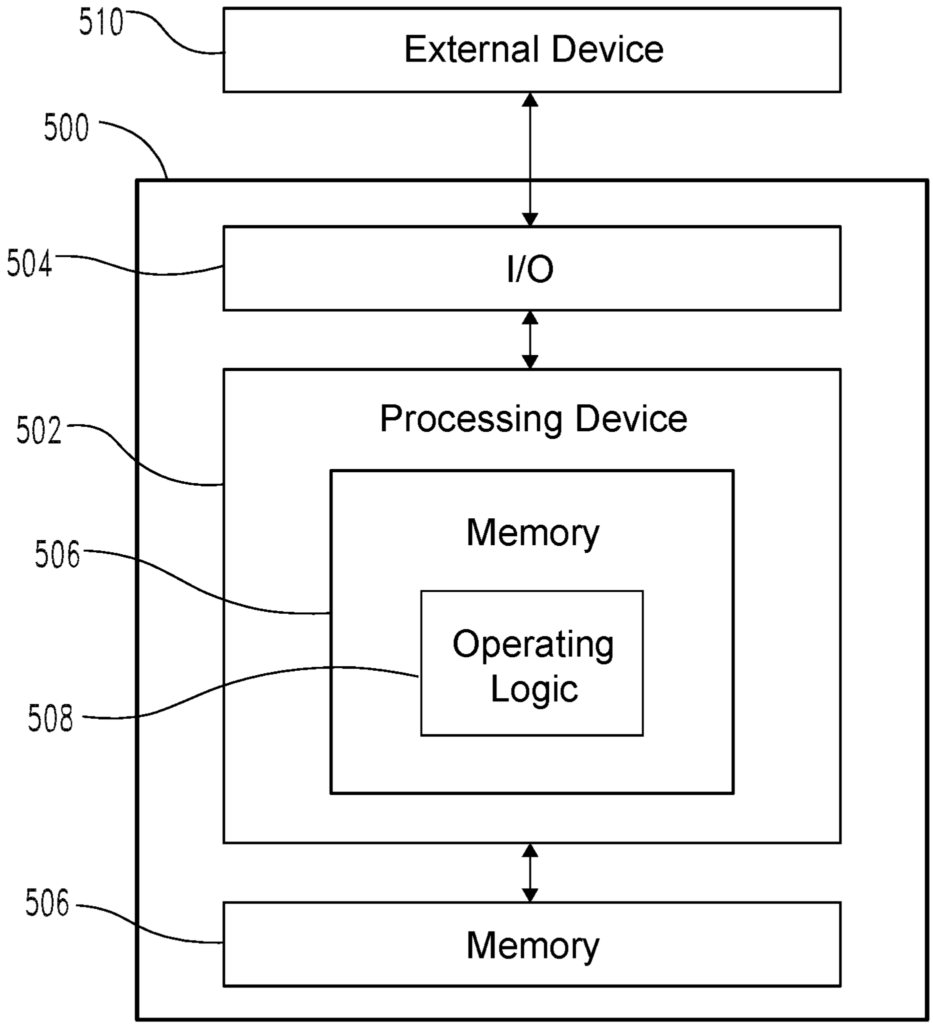
FIG. 17 is a schematic block diagram of a computing device that may be utilized in connection with certain embodiments.

Referring now to FIG. 17, a simplified block diagram of at least one embodiment of a computing device 500 is shown. The illustrative computing device 500 depicts at least one embodiment of a controller that may be utilized in connection with the controller 162 illustrated in FIG. 4.

Depending on the particular embodiment, the computing device 500 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the external device 70, the latch retraction assembly 140, the drive assembly 150, the energy storage device(s) 164, and/or the EL/EU selection switch 168. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 17, it should be appreciated that a particular computing device 500 may include multiple processing devices 502, I/O devices 504, and/or memories 506 in other embodiments. Further, in some embodiments, more than one external device 510 may be in communication with the computing device 500.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lockset, comprising:

a housing;

a latchbolt mounted in the housing for movement between an extended position and a retracted position, wherein the latchbolt is biased toward the extended position by a return spring;

a latch retraction assembly, comprising:

a drive nut configured to cause movement of the latchbolt toward the retracted position when the drive nut is moved in a first linear direction and to cause movement of the latchbolt toward the extended position when the drive nut is moved in a second linear direction;

a lead screw threadedly engaged with the drive nut, wherein the lead screw is configured to move the drive nut in the first linear direction when the lead screw is rotated in a first rotational direction, and wherein the lead screw is configured to move the drive nut in the second linear direction when the lead screw is rotated in a second rotational direction; and a motor, wherein the motor is configured to rotate the lead screw in the first rotational direction in response to a retract signal, wherein the motor is configured to rotate the lead screw in a second rotational direction in response to a return signal, and wherein the latch retraction assembly is self-dogging to prevent the return spring from returning the latchbolt to the extended position prior to receipt of the return signal; and a support post offset from the lead screw, wherein the support post is engaged with the drive nut and prevents the drive nut from rotating with the lead screw.

2. The lockset of claim 1, wherein the latch retraction assembly is operable to retain the latchbolt in the retracted position without consuming electrical power.

3. The lockset of claim 1, wherein the support post extends through an aperture of the drive nut to thereby prevent the drive nut from rotating with the lead screw.

4. A lockset, comprising:

a housing;

a latchbolt mounted in the housing for movement between an extended position and a retracted position, wherein the latchbolt is biased toward the extended position by a return spring;

a latch retraction assembly, comprising:

a motor;

a lead screw operable to be rotated by the motor; and a drive nut threadedly engaged with the lead screw and configured to move linearly in response to rotation of the lead screw, wherein movement of the drive nut in a first linear direction causes retraction of the latchbolt, and wherein movement of the drive nut in a second linear direction causes extension of the latchbolt; and a retraction lever pivotably mounted in the housing, wherein the retraction lever is configured to retract the latchbolt in response to movement of the drive nut in the first linear direction;

wherein the motor is configured to rotate the lead screw in a first rotational direction in response to a retract signal to thereby move the drive nut in the first linear direction;

wherein the motor is configured to rotate the lead screw in a second rotational direction in response to a return signal to thereby move the nut in the second linear direction; and wherein the latch retraction assembly is self-dogging to prevent the return spring from returning the latchbolt to the extended position prior to receipt of the return signal.

5. The lockset of claim 4, further comprising an actuation lever pivotably mounted in the housing, wherein the actuation lever is configured to cause the retraction lever to retract the latchbolt in response to movement of the drive nut in the first linear direction.

6. The lockset of claim 4, further comprising an actuation roller rotatably mounted to the drive nut, wherein the actuation roller is configured to cause the retraction lever to retract the latchbolt in response to movement of the drive nut in the first linear direction.

7. The lockset of claim 1, further comprising a control assembly;

wherein the control assembly is configured to store electrical energy in an energy storage device in response to receiving a retract command;

wherein the control assembly is configured to transmit the retract signal in response to the energy storage device storing a threshold level of electrical energy; and wherein the control assembly is configured to transmit the return signal with electrical energy stored in the energy storage device in response to receiving a return command.

8. The lockset of claim 1, further comprising a mortise chassis comprising the housing, the latchbolt, and the latch retraction assembly; and wherein the mortise chassis is operable to be mounted in a standard mortise pocket having a depth of 4 inches, a height of 6⅜ inches, and a width of no greater than 1¼ inches.

9. The lockset of claim 1, further comprising a wireless communication device aligned with an opening in the housing such that the wireless communication device is operable to transmit information via the opening.

10. The lockset of claim 9, wherein the wireless communication device is configured to transmit the information in infrared and/or visible light.

11. The lockset of claim 9, further comprising a peripheral device operable to receive information from the wireless communication device, and to display an indication related to the received information.

12. A lockset having a locked/unlocked state and a latched/unlatched state, the lockset comprising:

a housing;

a latchbolt mounted in the housing for movement between an extended position, in which the latched/unlatched state is a latched state, and a retracted position, in which the latched/unlatched state is an unlatched state, and wherein the latchbolt is biased toward the extended position;

a latch retraction assembly including a motor, wherein the latch retraction assembly is configured to operate the motor in response to a latch/unlatch signal to thereby adjust the latched/unlatched state of the lockset; and a drive assembly comprising a second motor, wherein the drive assembly is configured to operate the second motor in response to a lock/unlock signal to thereby adjust the locked/unlocked state.

13. The lockset of claim 12, further comprising:

a control assembly operable to transmit the lock/unlock signal to the second motor, and wherein the control assembly is operable to transmit the latch/unlatch signal to the motor of the latch retraction assembly.

14. The lockset of claim 13, further comprising a latch retraction energy storage device;

wherein the control assembly is configured to perform a retract operation in response to a retract signal, the retract operation comprising:

storing electrical energy from an external device in the energy storage device to thereby provide a stored electrical energy; and in response to the stored electrical energy exceeding a threshold, operating the motor of the latch retraction assembly with electrical energy from the external device to thereby move the latchbolt from the extended position to the retracted position; and wherein the control assembly is further configured to perform an extend operation in response to an extend signal, the extend operation comprising operating the motor of the latch retraction assembly with the stored electrical energy from the energy storage device to thereby move the latchbolt from the retracted position to the extended position.

15. The lockset of claim 12, wherein the latch retraction assembly is self-dogging and operable to retain the latchbolt in the retracted position against the biasing force without consuming electrical power.

16. A method of operating a mortise lockset connected to an external device, wherein the mortise lockset comprises a housing, a latchbolt mounted in the housing for movement between an extended position and a retracted position, and a latch retraction assembly including a motor operable to extend and retract the latchbolt, and wherein the latchbolt is biased toward the extended position, the method comprising:

in response to receiving a retract command from the external device, storing electrical energy in an energy storage device;

in response to storing a threshold level of electrical energy in the energy storage device, operating the latch retraction assembly using power from the external device to thereby retract the latchbolt;

mechanically dogging the latch retraction assembly when the latchbolt is retracted to thereby retain the latchbolt in a retracted position until receipt of a return command, wherein the latch retraction assembly comprises a lead screw and a drive nut threadedly engaged with the lead screw to thereby define a threaded connection, and wherein the threaded connection mechanically dogs the latch retraction assembly by preventing a linear force on the drive nut from rotating the lead screw; and in response to receiving the return command from the external device, operating the latch retraction assembly using the electrical energy stored in the energy storage device to thereby extend the latchbolt.

17. The method of claim 16, wherein the latch retraction assembly comprises a lead screw and a drive nut threadedly engaged with the lead screw; and wherein the method further comprises preventing rotation of the drive nut by slidably engaging the drive nut with a support post.

18. The method of claim 16, further comprising calibrating the mortise lockset, the calibrating comprising determining a number of motor rotations for retraction of the latchbolt; and wherein operating the latch retraction assembly using power from the external device to thereby retract the latchbolt comprises operating the motor based on the number of motor rotations to thereby retract the latchbolt.

19. A lockset having a latched/unlatched state, the lockset comprising:

a housing;

a latchbolt mounted in the housing for movement between an extended position, in which the latched/unlatched state is a latched state, and a retracted position, in which the latched/unlatched state is an unlatched state, and wherein the latchbolt is biased toward the extended position; and a latch retraction assembly including a motor, wherein the latch retraction assembly is configured to operate the motor in response to a latch/unlatch signal to thereby adjust the latched/unlatched state of the lockset, wherein the latch retraction assembly further comprises:

a lead screw operable to be rotated by the motor of the latch retraction assembly in each of a first rotational direction and a second rotational direction opposite the first rotational direction;

a drive nut threadedly engaged with the lead screw to thereby define a threaded connection, wherein the drive nut is configured to move in a first linear direction in response to rotation of the lead screw in the first rotational direction, and wherein the drive nut is configured to move in a second linear direction in response to rotation of the lead screw in the second rotational direction;

an energy storage device operable to store electrical energy; and a control assembly operable to connect to an external device;

wherein the control assembly is configured to store electrical energy in the energy storage device in response to receiving a first command from the external device, and to cause the motor of the latch retraction assembly to rotate the lead screw in the first rotational direction in response to the energy stored in the energy storage device exceeding a threshold;

wherein to cause the motor of the latch retraction assembly to rotate the lead screw in the first rotational direction comprises to ramp up a rotational speed of the lead screw over a predetermined ramp time of at least 10 milliseconds; and wherein the control assembly is configured to cause the motor of the latch retraction assembly to rotate the lead screw in the second rotational direction using the energy stored in the energy storage device in response to receiving a second command from the external device.

20. The lockset of claim 19, further comprising a support post extending in a direction of the lead screw; and wherein the drive nut includes an aperture through which the support post passes such that the support post prevents the drive nut from rotating with the lead screw.

21. The lockset of claim 19, further comprising an actuation roller rotatably mounted to the drive nut.

22. The lockset of claim 19, wherein the threaded connection is configured to cause the drive nut to move linearly in response to rotation of the lead screw, and to prevent the drive nut from moving linearly to cause rotation of the lead screw.

23. The lockset of claim 19, wherein the control assembly is further configured to detect stalling of the motor of the latch retraction assembly.

24. The lockset of claim 12, further comprising a handle, wherein the handle is operable to retract the latchbolt when the locked/unlocked state is an unlocked state, and wherein the handle is inoperable to retract the latchbolt when the locked/unlocked state is a locked state.

* * * * *